(12) United States Patent
Terada et al.

(10) Patent No.: US 8,381,103 B2
(45) Date of Patent: Feb. 19, 2013

(54) ELECTRONIC DEVICE

(75) Inventors: Kotaro Terada, Hamamatsu (JP);
Masaru Aiso, Hamamatsu (JP);
Masaaki Okabayashi, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 1218 days.

(21) Appl. No.: 11/710,660

(22) Filed: Feb. 23, 2007

(65) Prior Publication Data
US 2007/0209002 A1    Sep. 6, 2007

(30) Foreign Application Priority Data

Mar. 1, 2006  (JP) ................................. 2006-055236
Mar. 1, 2006  (JP) ................................. 2006-055248
Mar. 1, 2006  (JP) ................................. 2006-055255

(51) Int. Cl.
*G06F 3/00* (2006.01)
*G06F 3/048* (2006.01)
*G10C 3/12* (2006.01)

(52) U.S. Cl. ........ 715/705; 715/706; 715/713; 715/714; 84/424

(58) Field of Classification Search .................. 715/705, 715/708, 713, 714, 760, 764; 84/424, 478, 84/462
See application file for complete search history.

(56) References Cited

U.S. PATENT DOCUMENTS

| 5,361,672 | A | 11/1994 | Koyama et al. |
| 5,710,898 | A | 1/1998 | Tozuka et al. |
| 6,365,815 | B2 * | 4/2002 | Ishida ............................. 84/478 |
| 6,456,303 | B1 * | 9/2002 | Walden et al. ................ 715/705 |
| 6,801,222 | B1 * | 10/2004 | Dunham et al. ............... 715/714 |
| 7,380,250 | B2 * | 5/2008 | Schechter et al. ............. 719/328 |
| 2002/0107891 | A1 * | 8/2002 | Leamon et al. ................ 707/513 |
| 2005/0154985 | A1 * | 7/2005 | Burkhart et al. .............. 715/705 |
| 2006/0248460 | A1 * | 11/2006 | Rogerson et al. ............. 715/705 |

FOREIGN PATENT DOCUMENTS

| JP | 07-253779 | 10/1995 |
| JP | 10-040241 A | 2/1998 |
| JP | 2000-047779 A | 2/2000 |

OTHER PUBLICATIONS

Yamaha Digital mixing console M7CL owners manual, 2005, pp. 10, 18, 25-30, 191-206, 282.*
Notification of Reason(s) for Refusal mailed Nov. 9, 2010, for JP Application No. 2006-055255, with English Translation, four pages.

* cited by examiner

*Primary Examiner* — Haoshian Shih
(74) *Attorney, Agent, or Firm* — Morrison & Foerster LLP

(57) ABSTRACT

When a jump instruction to display contents regarding a control out of contents in a help screen is given, if the jump instruction is given for a control with the same identification data as that of a control for which a preceding instruction is given, an explanation at a position next to a position of contents displayed in response to the preceding jump instruction is displayed on the help screen, out of the contents of a help data corresponding to the identification data of the control. If the jump instruction is given for a control with different identification from that of the control corresponding to the preceding jump instruction, an explanation at a head position, out of explanations in the help data corresponding to the identification data of the control for which the current jump instruction is given is displayed on the help screen.

13 Claims, 14 Drawing Sheets

F I G. 1
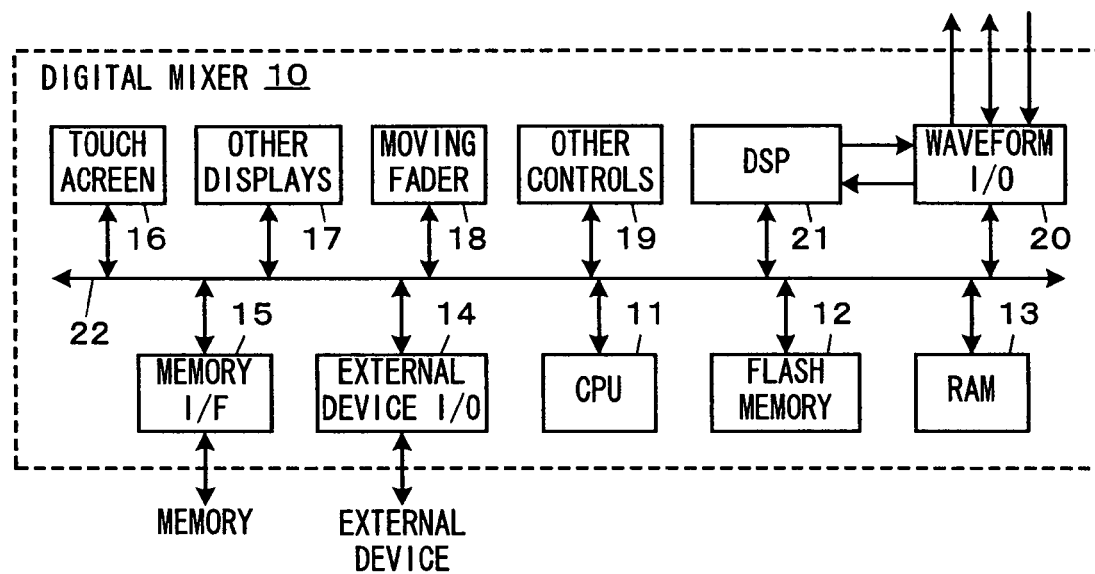

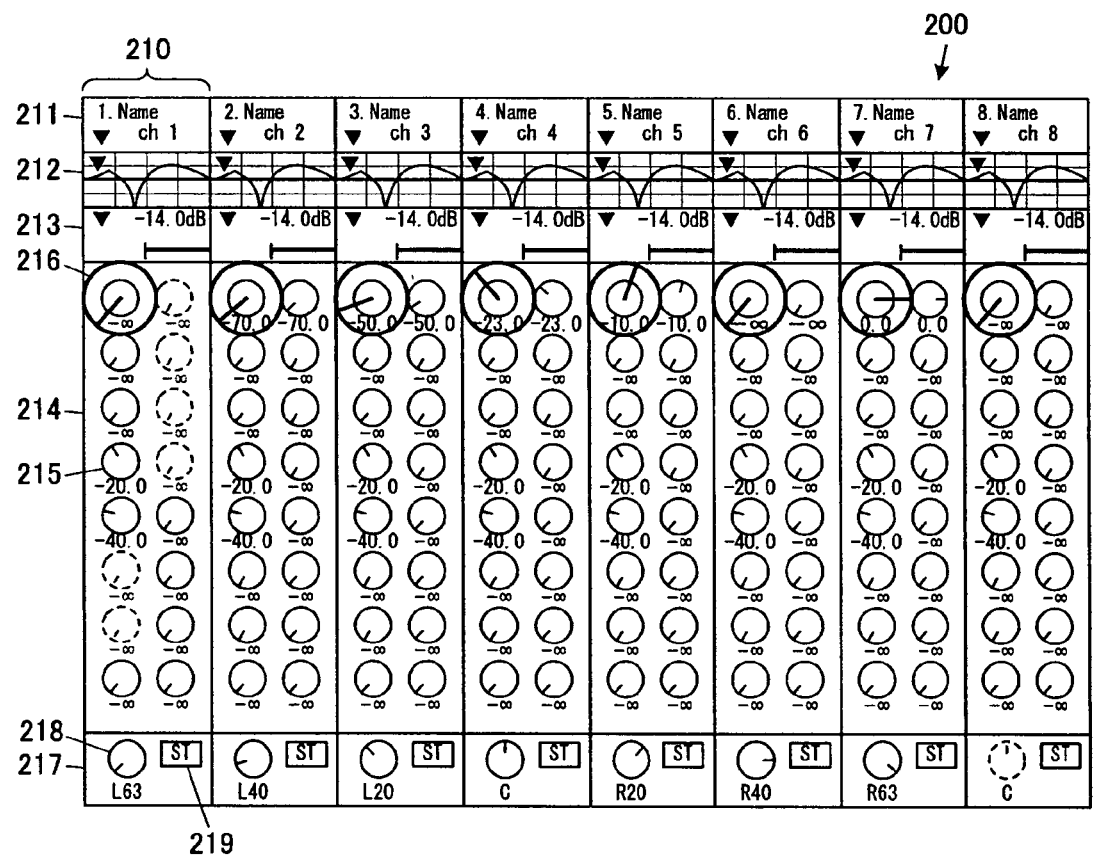
F I G. 3

FIG. 7

```xml
<?xml version="1.0" encoding="UTF-8" ?>
- <exphelp version="1.0.0" modelname="digital_mixer_X2"      —401
    xmlns="http://www.example.com/">                                    402
- <section id="NAME_AND_FUNCTION" title="Names and functions of respective
sections">
    - <section id="TOP_PANEL" title="Top panel">  —403
              ⋮

- <section id="SELECTED_CH" title="SELECTED CHANNEL section">—404
      <helpanchor id="2" />  —405
                                                                         —406
407    - <section id="MIX_MATRIX_ENCODER" title="1. [MIX/MATRIX] encorder">
   — <text>                              408
        - When an input channel is selected<br/>
        This adjusts the send level of the signal sent from that channel
        to the MIX/MATRIX buses.<br/>
        - When a MIX channel is selected<br/>
        This adjusts the send level of ...<br/>
        - When a MATRIX channel is selected<br/>
        This adjusts the send level of ...<br/>
      </text>
    </section>
    - <section id="HA_ENCODER" title="2. [HA] encoder">  —409
      <text>
        Adjusts the head amp gain of an input channel.<br/>
      </text>
    </section>
              ⋮
  </section>
              ⋮
</section>
              ⋮
```

FIG. 8

```xml
          ⋮
- <section id="INPUTCH_OPERATION" title="INPUT channel operations">
  - <section id="INPUTCH_TO_MIXBUS"
      title="Sending the signal from an input channel to the MIX buses">
    - <section id="SELECTED_CH_UT1"
        title="Using the SELECTED CHANNEL section">
        <helpanchor id="2" />  ── 410
        <text>
          1. Make sure that an output port is assigned to each MIX bus to which
          you want to send signals, and ...
                ⋮
        </text>
      </section>
          ⋮
  </section>
</section>

- <section id="SELECTED_CH_OPERATION"
    title="Operations in the SELECTED CHANNEL section">
  - <section id="SELECTED_CH_OPERATION_DETAIL"
      title="Operations in the SELECTED CHANNEL section">
      <helpanchor id="2" /> ──411
    - <section id="SELECTED_CH_OPERATION_MIX/MATRIX"
        title="Adjusting the send level to a MIX/MATRIX bus">
        <text>
        Use the TO MIX/TO MATRIX field when you want to send the signal from an
        INPUT/ST IN channel to a MIX bus, or ...
                ⋮           412
                            /
        Next, use the corresponding <helplink sectionid="MIX_MATRIX_ENCODER">
        [MIX/MATRIX] encorders</helplink> of the SELECTED CHANNEL section
        to adjust the send levels of the signal sent to each bus.
                ⋮
        </text>
      </section>
          ⋮
  </section>
</section>
          ⋮
</exphelp>
```

FIG. 12

| SECTION ID | SECTION POSITION (LINE) |
|---|---|
| InputCH_gen | 10 |
| InputFADER_gen | 15 |
| InputPAN_gen | 22 |
| InputPAN_det | 27 |
| InputON_gen | 35 |
| InputFADER_det | 40 |
| InputFADER_fun | 48 |
| InputSEL_gen | 52 |
| ⋮ | ⋮ |

FIG. 13

| CONTROL ID | SECTION POSITION (LINE) |
|---|---|
| 1 | 80 |
| 2 | 15 |
| 2 | 40 |
| 2 | 48 |
| 3 | 22 |
| 3 | 256 |
| 4 | 52 |
| ⋮ | ⋮ |

ELECTRONIC DEVICE

BACKGROUND OF THE INVENTION

1. Field of the Invention

The invention relates to an electronic device having a help function with which the contents such as explanations and the like about functions and operations of the device can be displayed on a display according to an operation by a user.

2. Description of the Related Art

Various electronic devices have conventionally been provided with a help function with which explanations about functions and operations of the device can be displayed on a display according to an operation by a user.

For example, JP, 7-253779, A describes an electronic musical instrument having a function with which a help screen including an explanation about each switch provided on an operation panel can be displayed on a display screen when the switch is operated after a help button is operated.

According to such a conventional device, if explanations are prepared in one-to-one correspondence to controls or their functions, a user can easily refer to the explanation corresponding to each of the controls or its function, resulting in high operability.

JP, 7-253779, A also describes an art in which the help screen is displayed on the display screen when the help button is turned on, and when the help button is turned on again, the display is returned to a function screen which was displayed before the switching to the help screen.

Such a conventional device can facilitate screen switching for displaying the help screen only when the explanation is needed and displaying the function screen for a regular operation in other cases. Therefore, even in a case where the help screen and the function screen cannot be displayed concurrently, it is possible to refer to the help screen with good operability.

SUMMARY OF THE INVENTION

In preparing explanations to be displayed on a help screen, it is sometimes more preferable to write explanations corresponding to a control or its function at a plurality of dispersed positions, in view of explanations according to intended uses and the whole constitution of the explanations.

However, the conventional art as described in JP, 7-253779, A has a problem that, in a case where explanations corresponding to a control or its function exist at a plurality of dispersed positions in data used for displaying the explanations, it is difficult to make these explanations efficiently referable.

Further, in the help screen, a series of explanations to be displayed cannot be always displayed within one screen. If one screen cannot display all the explanations, a user sometimes continuously reads the explanations while scrolling the help screen. In such a case, there has been a demand for enabling a user to perform a series of operations while he/she continuously reads the explanations on the help screen.

However, the conventional art as described in JP, 7-253779, A cannot fully satisfy such a demand since only a specific screen whose display is instructed can be displayed when the help screen is displayed.

There is also a demand for enabling a user to use a help document of his/her own in order to customize the help screen and add a memorandum unique to the user.

However, in the conventional art as described in JP, 7-253779, A, a help document describing the contents of the help screen is a document unique to the device and it is difficult for a user to edit the help document. Further, each device pays no attention to whether or not it is capable of displaying the contents of a help document stored in itself, and editing the help document might cause a trouble to the display of the help screen and the behavior of the device unless the contents of the help document are consistent with the processing contents of the device.

Therefore, it has not been possible for conventional devices to fully satisfy the demand of a user for the use of a user's own help document.

These problems similarly arise also in a case where the displayed contents are not "explanations" or the device is not an electronic musical instrument.

It is an object of the invention to solve these problems and make it possible to efficiently refer to the contents corresponding to a control or its function even in a case where the contents exist at a plurality of dispersed positions in data used for displaying a help screen.

It is another object to achieve high operability when a user performs an operation on a regular operation screen other than a help screen while continuously reading the contents in the help screen even in a case where the help screen cannot be displayed within one screen.

It is still another object to make it possible to maintain a function of a help screen as much as possible even in a case where a user's own help document is made usable.

To attain the above objects, an electronic device of the invention is an electronic device having a display controller which, in response to a jump instruction to display contents regarding a control out of contents in a help screen, displays, on the help screen, contents corresponding to identification data of the control for which the jump instruction is given, based on help data in which the contents corresponding to the identification data of the control are included at a plurality of dispersed positions, the device including: a first help controller which, when the jump instruction is given for a control with same identification data as identification data of a control for which a preceding jump instruction is given, displays, on the help screen, contents at a position subsequent to a position of contents displayed in response to the preceding jump instruction, out of contents corresponding to the identification data of the control; and a second help controller which, when the jump instruction is given for a control with identification data different from the identification data of the control for which the preceding jump instruction is given, displays, on the help screen, contents at a head position, out of contents corresponding to the identification data of the control for which the current jump instruction is given.

Another electronic device of the invention is an electronic device having a help key for accepting an instruction to display a help screen, the device including: a display controller which, in response to an operation of another control during an ON operation of the help key, displays, on a display, the help screen including contents corresponding to the operated control; a switch controller which, in response to an OFF operation of the help key performed while no other control is operated during the ON operation of the help key, switches a screen to be displayed on the display between two kinds of screens by a toggle, the two kinds of the screens being the help screen and a regular operation screen other than the help screen; a scroll controller which scrolls the contents of the currently displayed help screen according to an instruction by a user; and a screen content memory which stores data indicating a display state that each of the help screen and the regular operation screen has at an instant when the screen is displayed on the display most recently, wherein, in the screen switching, the switch controller displays, on the display, a selected screen in a same state as the state of the same kind of screen displayed most recently, based on the data stored in the screen content memory.

In such an electronic device, the help key is preferably a hardware key.

A still another electronic device of the invention includes: a loader which is capable of loading help data and a document in a format different from a format of the help data, the help data including position data indicating positions of contents corresponding to identification data of a plurality of controls and format data indicating a display format; a display controller which displays, on a display, contents of data loaded by the loader; a first controller which causes the display controller to reflect the format data in a display format on the display, only when determining, based on data included in the data loaded by the loader, that the loaded data is help data whose format data is interpretable, and otherwise, causes the display controller to display the contents of the data loaded by the loader as text on the display; and a second controller which, only when determining, based on the data included in the data loaded by the loader, that the loaded data is help data whose format data is interpretable and which is written for a model of the electronic device, permits a jump action in which contents at a position indicated by the position data corresponding to the identification data of an operated control, out of contents in the help data, are displayed on the display according to an operation of the control.

In such an electronic device, preferably, each of the position data is described as an anchor tag including the identification data of the control and buried in a position where the contents corresponding to the identification data are described, and in response to the operation of the control, the jump action is executed by displaying, on the display, the contents at the position of the anchor tag including the identification data of the operated control, out of the contents included in the help data.

Further, preferably, the help data includes the format data as a display tag for formatting the display, further includes a link tag indicating a reference destination, and is described in a markup language; the first controller causes the display controller to reflect contents of the display tag and the link tag in the display on the display when determining that the display tag and the link tag included in the help data used for the display on the display are interpretable; and the electronic device further includes a second display controller which displays, on the display, data of the reference destination indicated by the link tag, when a portion marked with the link tag in the help data is selected on a screen displayed on the display.

Preferably, the electronic device further includes: an interface in which a removable memory is mountable; and an access manager which decides whether or not an operation to the electronic device is to be permitted, wherein the loader loads, from the memory, the help data or the document together with certification data used for certifying a user when the memory is mounted in the interface; the access manager permits only an operation to be permitted to anyone until a certification process using the certification data loaded by the loader succeeds, permits an operation to be permitted to an owner of the certification data when the certification process succeeds, and returns to a state of permitting only the operation to be permitted to anyone when the memory is removed from the interface; and the display controller uses the document loaded by the loader for the display irrespective of the state of the access manager.

Further, the invention can be implemented not only as an apparatus invention but also as a method invention. Further, the invention can be implemented as a program of a processor such as a computer, and can be also implemented as a memory storing such a program.

The above and other objects, features and advantages of the invention will be apparent from the following detailed description which is to be read in conjunction with the accompanying drawings.

BRIEF DESCRIPTION OF THE DRAWINGS

FIG. 1 is a block diagram showing the configuration of a digital mixer which is an embodiment of the electronic device of the invention;

FIG. 3 is a view showing an example of an input channel screen displayed on a touch screen of the digital mixer shown in FIG. 1;

FIG. 7 is a view showing an example of help data in XML format used for displaying the help screen;

FIG. 8 is a view showing another portion of the help data;

FIG. 12 is a view showing an example of a link table created in the processes shown in FIG. 11;

FIG. 13 is a view showing an example of an anchor table created in the processes shown in FIG. 11;

DETAILED DESCRIPTION OF THE PREFERRED EMBODIMENTS

Figure 2:
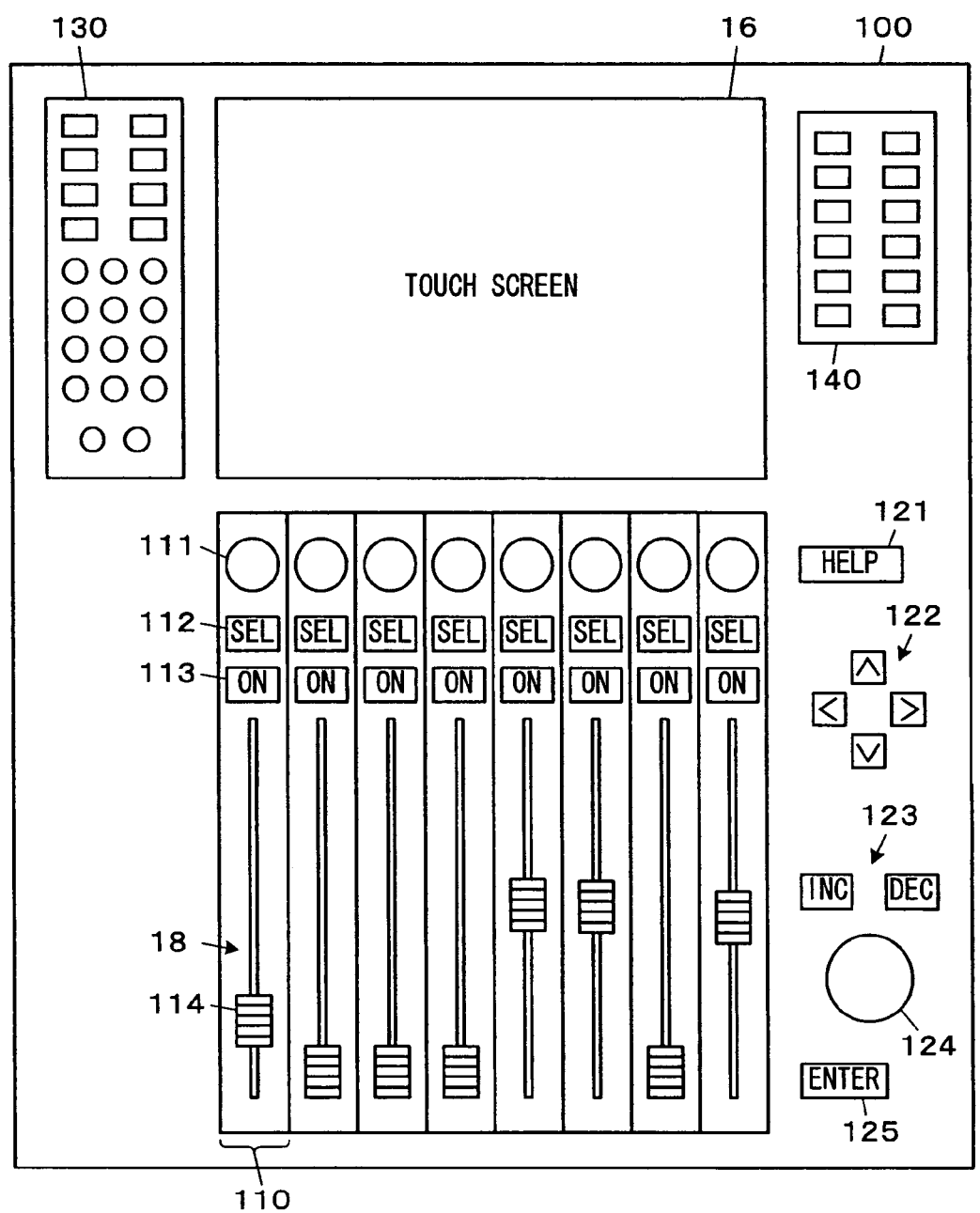
FIG. 2 is a view showing a schematic structure of a console included in the digital mixer shown in FIG. 1.

Hereinafter, the best mode for carrying out the invention will be concretely described based on the drawings.

First, the configuration of a digital mixer which is an embodiment of the electronic device of the invention is shown in FIG. 1.

FIG. 1 is a block diagram showing the configuration of the digital mixer.

As shown in FIG. 1, a digital mixer 10 includes a CPU 11, a flash memory 12, a RAM 13, an external device input/output module (I/O) 14, a memory interface (I/F) 15, a touch screen 16, other displays 17, moving faders 18, other controls 19, a waveform I/O 20, and a digital signal processor (DSP) 21, all of which are connected to one another via a system bus 22. The digital mixer 10 has a function of applying various kinds of signal processing to audio signals inputted from a plurality of input channels and outputting the processed audio signals from a plurality of output channels.

The CPU 11 is a controller controlling the whole operation of the digital mixer 10. By executing desired control programs stored in the flash memory 12, the CPU 11 executes processing such as: controlling the communication in the external device I/O 14 and the waveform I/O 20 and the display on the touch screen 16 and the other displays 17; detecting operations of the moving faders 18 and the other controls 19 to control the setting/change of parameter values and the operation of respective parts according to the detected operations; reading help data from a memory mounted in the memory I/F 15 to display the contents thereof on the touch screen 16; and reading certification data from the memory to certify a user based on the certification data.

The flash memory 12 is a rewritable nonvolatile memory storing data to be retained even after the power is off, such as the control programs executed by the CPU 11, user data and passwords used for the user certification, and user authority data.

The RAM 13 is a memory which stores data to be temporarily stored and is used as a work memory of the CPU 11.

The external device I/O 14 is an interface for connecting various external devices thereto and inputting/outputting data from/to the external devices. For example, interfaces for connection to an external display, a mouse, a keyboard for character input, an operation panel, and the like are prepared as the external device I/O 14. Even if displays and controls of a main body of the device have a very simple structure, it would be possible to change/set parameters and give operation instructions by making full use of these external devices.

The memory I/F 15 is an interface to which a removable nonvolatile memory is connectable, and can be an interface in which, for example, a USB (Universal Serial Bus) memory or a SD (Secure Digital) memory card are mountable.

The touch screen 16 is a display which can accept user's operations to the displayed contents on a display screen displaying a GUI (graphical user interface) and so on, and can be constituted by, for example, a touch panel stacked on a liquid crystal panel (LCD). The display on the touch screen 16 and the detection of the operation contents are executed under the control by the CPU 11.

The other displays 17 are displays, except the touch screen 16, displaying various data under the control by the CPU 11, and can be structured by, for example, light-emitting diodes (LED) and small LCDs. Alternatively, they can be structured by LEDs buried in controls.

The moving faders 18 are level controls for setting a parameter indicating the level of a fader of each channel in the digital mixer 10, and for example, can be structured to include knobs as operation parts and detect an operation amount by detecting a shift amount of each of the knobs by a linear encoder. Further, the moving faders 18 include drivers such as motors for driving the knobs, and the knobs can be moved to an arbitrary position under the control by the CPU 11.

The other controls 19 are controls, except the moving faders 18, for accepting operations to the digital mixer 10, and can be constituted by various keys, buttons, dials, sliders, and the like.

The waveform I/O 20 is an interface to accept the input of audio signals to be processed in the DSP 21 and output the processed audio signals. In the waveform I/O 20, appropriate combination of a plurality of boards out of the following boards can be mounted: an A/D conversion board capable of analog input of 4 channels per board; a D/A conversion board capable of analog output of 4 channels per board; and a digital input/output board capable of digital input/output of 8 channels per board. Actually, signals are inputted/outputted to/from the waveform I/O 20 via these boards.

The DSP 21 is a signal processor which includes a signal processing circuit, and applies various kinds of signal processing such as mixing and equalizing to the audio signals inputted from the waveform I/O 20 according to values of various parameters included in operation data stored in a current memory and outputs the processed audio signals to the waveform I/O 20. A memory area of the current memory can be prepared in the RAM 13 or in a memory that the DSP 21 itself has. Further, the operation data is data including one set of the values of the parameters used for the signal processing by the DSP 21.

Incidentally, the DSP 21 has 32 input channels, and input channels of the DSP 21 are made to correspond to input ports of the waveform I/O 20 respectively by an input patch, whereby a signal inputted to the waveform I/O 20 can be inputted to the corresponding input channel.

Further, the DSP 21 has a pair of stereo (ST) buses and 16 mixing (MIX) buses, and is capable of sending signals inputted to the input channels, to the respective buses according to the set contents of the parameters, and is also capable of mixing signals inputted to the same bus.

Outputs of these buses are outputted from corresponding output channels, and as for output routes, similarly to the input routes, the output channels of the DSP 21 are made to correspond to output ports of the waveform I/O 20 respectively by an output patch.

Next, the structure of a console of the digital mixer 10 will be described.

FIG. 2 is a view showing a schematic structure of the console.

The digital mixer 10 has a console 100 with a structure shown in FIG. 2, and the constituent elements shown in FIG. 1 as the touch screen 16, the other displays 17, the moving faders 18, and the other controls 19 are provided on the console 100.

These constituent elements are roughly grouped as to function, and on an area excluding the touch screen 16, they are provided as channel strips 110, a help key 121, cursor keys 122, increment and decrement keys 123, a rotary encoder 124, an enter key 125, and various controls 130, 140.

Among them, each of the channel strips 110 has controls for setting values of parameters for one input channel or one output channel, and since the eight channel strips 110 are arranged, the setting operation of the values of the parameters for totally eight channels can be accepted. When a user operates a control among the various controls 140, each of the channel strips 110 is assigned to a concrete channel and used as a control for setting the parameter of the assigned channel.

Further, each of the channel strips 110 includes a rotary encoder 111, a selection switch 112, an ON switch 113, and the moving fader 18.

Among them, the rotary encoder 111 is a control to detect a rotation amount of the knob as an operation amount. A control on a screen displayed on the touch screen 16 is assigned to the rotary encoder 111 as will be described later, and the rotary encoder 111 can be used for setting a value of a parameter corresponding to the assigned control.

The selection switch 112 is a control for setting selection/nonselection of the corresponding channel. Further, the selection switch 112 can also be used as a control for accepting an instruction to display, on the touch screen 16, a screen for the setting relating to the corresponding channel.

The ON switch 113 is a control for setting ON/OFF of the corresponding channel.

The moving fader 18 is a control for setting the signal level of the corresponding channel according to the position of the knob 114. As described above, the knob 114 can be driven by the motor or the like.

The help key 121 is a key for accepting an instruction to display a help screen on the touch screen 16 based on the help data read by the CPU 11 from the memory connected to the memory I/F 15. By operating another control while pressing the help key 121, it is possible to display an explanation about the operated control, out of explanations displayed on the help screen. It is also possible to switch display/non-display of the help screen every time the help key 121 is pressed. These functions will be described in detail later.

The cursor keys 122 are controls for accepting an instruction to move a cursor on a screen displayed on the touch screen 16.

The increment and decrement keys 123 and the rotary encoder 124 are controls for accepting instructions to increment and decrement a parameter where the cursor resides on a screen displayed on the touch screen 16.

The enter key 125 is a control for accepting an instruction to finalize a value of a parameter set by the increment and decrement key 123 or the rotary encoder 124.

The various controls 130, 140 are controls for accepting various other instructions.

Next, a display example of a screen displayed on the touch screen 16 will be described.

First, a display example of an input channel screen is shown in FIG. 3.

This input channel screen 200 is a GUI screen for displaying the contents currently set as parameters used for signal processing in the input channels and accepting an operation relating to the setting or the parameters. When the input channels are assigned to the channel strips 110, the input channel screen 200 for displaying/accepting the setting relating to the assigned input channels is displayed on the touch screen 16. FIG. 3 shows an example of the screen in a case where the first to eighth input channels are assigned.

In such an input channel screen 200, channel slots 210 corresponding to the respective input channels are provided, and the contents relating to the channels are displayed therein. Each of the channel slots 210 includes a channel name block 211, a frequency characteristic block 212, a dynamics block 213, a send level display portion 214, and a pan display portion 217.

Among them, the channel name block 211 is a block to display a number, name, an intended use, and the like of the channel.

The frequency characteristic block 212 is a block to display a graph showing a frequency characteristic of an equalizer based on a current value of a parameter.

The dynamics block 213 is a block to display a value of a threshold which is a parameter of a compressor and to display a graph showing a reduction amount of an input level and a gain which are real-time values.

Further, when a touch operation takes place in any of the blocks on the touch screen 16, another GUI screen corresponding to the operated block is popup-displayed on the touch screen 16, and in this respect, each of the blocks can be also said to be a control.

The send level display portion 214 is a display portion where the levels and send ON/OFF which are set for send level faders provided in signal transmission routes from the corresponding input channel to the respective MIX buses are displayed by means of knobs 215 which are provided in correspondence to the respective MIX buses, and numerals thereunder.

Further, when any of the knobs 215 is touch-operated on the touch screen 16, the touched knob 215 is assigned to one of the rotary encoders 111 shown in FIG. 2, and a value of a parameter corresponding to the touched knob 215 can be set by the rotary encoder 111. The knob assigned to the rotary encoder 111 is shown by a cursor 216.

The pan display portion 217 is a display portion where a sound image localization position set for pan is displayed by means of a knob 218 and a numeral thereunder. Further, a ST (stereo) send button 219 is provided so as to make it possible to control ON/OFF of a ST send switch.

When the knob 218 is touch-operated on the touch screen 16, the knob 218 is assigned to one of the rotary encoders 111, similarly to the knob 215 described above, and a value of a parameter corresponding to this knob 218 can be set by the rotary encoder 111.

Further, when the knob 215 where the cursor 216 resides or the knob 218 is touch-operated again, another GUI screen for displaying and accepting the setting of values of parameters for eight channels relating to the operated knob is pop-up displayed.

The structure and functions of the input channel screen 200 are as described above.

Figure 4:
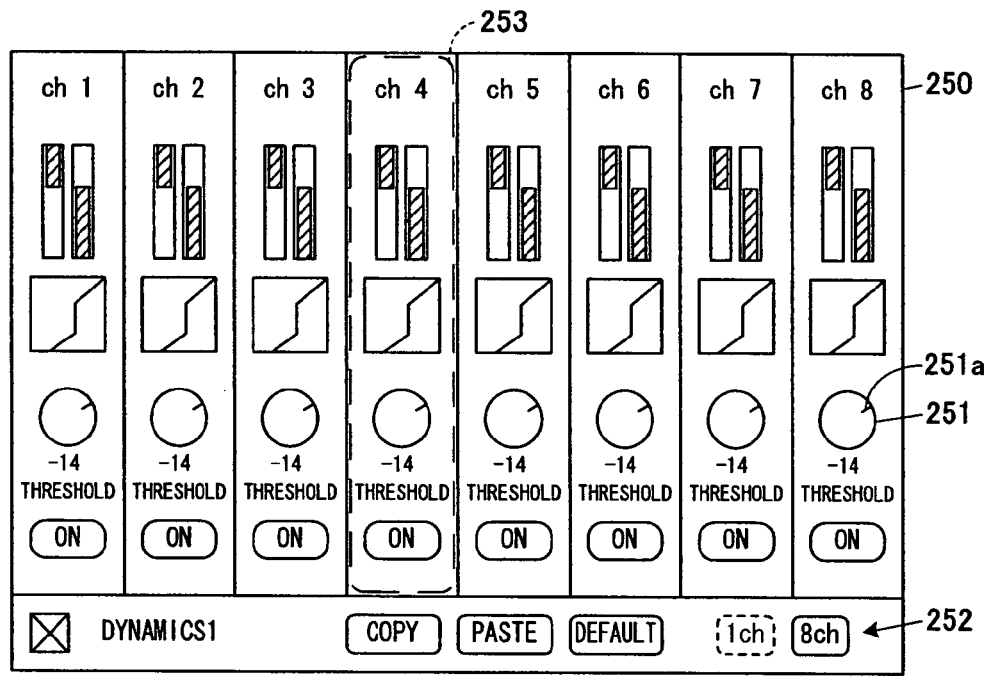
FIG. 4 is a view showing an example of a dynamics screen displayed on the touch screen.
Figure 5:
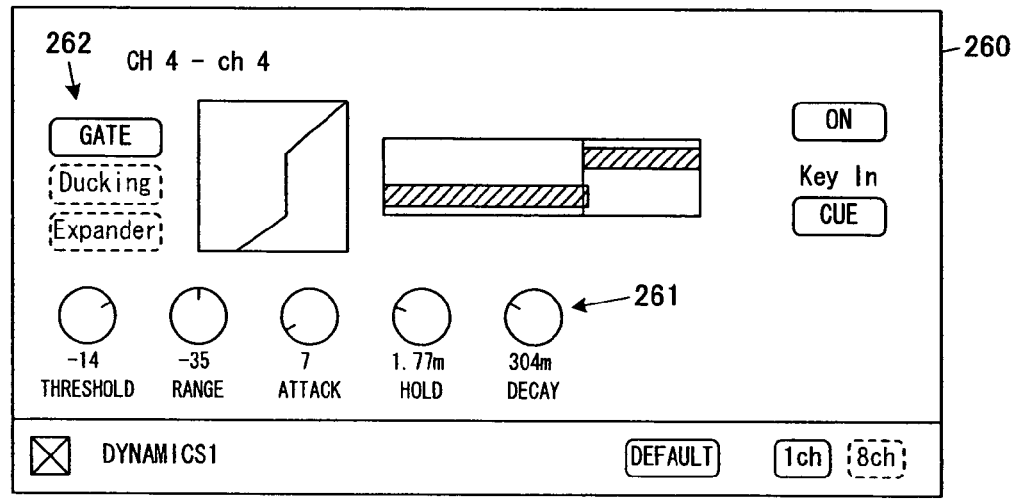
FIG. 5 is a view showing another example of the dynamics screen.

Next, the aforementioned other GUI screens corresponding to the blocks will be described, taking a dynamics screen as an example. FIG. 4 and FIG. 5 show examples of the dynamics screen.

First, a dynamics screen 250 shown in FIG. 4 is a screen for displaying characteristics set for attenuators and compressors of the eight channels whose contents are displayed on the input channel screen 200, in more detail than the dynamics blocks 213.

While the dynamics screen 250 is displayed, the knobs 251 are assigned to the rotary encoders 111, and values of parameters corresponding to the knobs 251 can be set by the rotary encoders 111.

Further, the position of a mark 251a of each of the knobs 251 and a numeral thereunder show a value of one parameter out of parameters settable for the compressor. Which parameter value is to be displayed can be set by using a menu (not shown) or the like, and here, as displayed under the knobs 251, a value of "THRESHOLD" is displayed.

Further, on the dynamics screen 250 described above, when a format selection button 252 for 1-channel display is operated, a dynamics screen 260 displaying the contents for one channel as shown in FIG. 5, which will be described next, can be displayed.

The dynamics screen 260 is a screen to accept the setting of values of all the parameters settable for the compressor of a channel selected or a channel where the cursor 253 resides on the dynamics screen 250.

While the dynamics screen 260 is displayed, five knobs 261 are assigned to the rotary encoders 111 respectively, and values of the parameters corresponding to the knobs 261 can be set by the rotary encoders 111. By using switch buttons 262, it is also possible to switch items set by the knobs 261.

Incidentally, while the dynamics screen 250 is displayed and while the dynamics screen 260 is displayed, the input channel screen 200 in the background is displayed in a grayout manner, and when this gray-out portion is touch-operated, the dynamics screen is closed and the display returns to the input channel screen 200.

Figure 6:
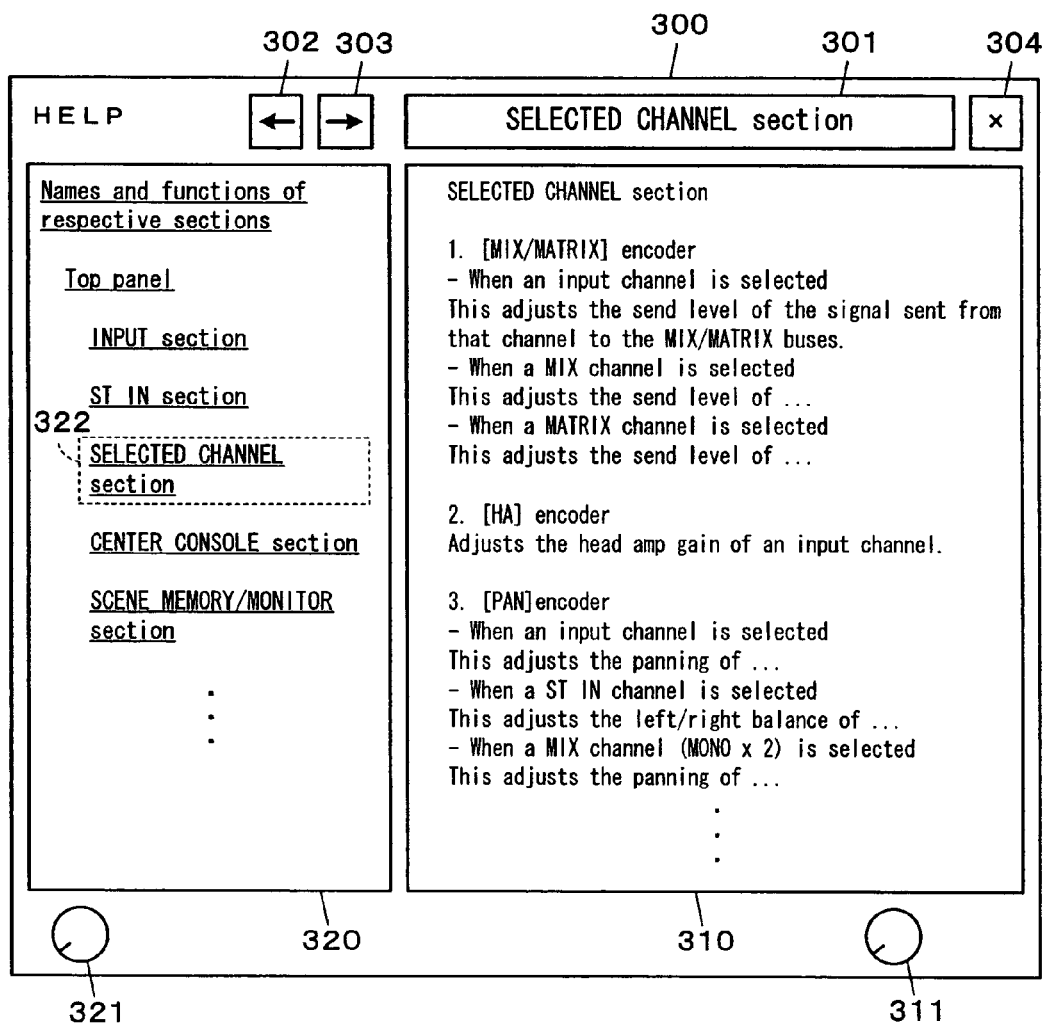
FIG. 6 is a view showing an example of a help screen displayed on the touch screen.

Next, a display example of the help screen is shown in FIG. 6. The contents for controlling the display on the help screen are one of main features of this embodiment.

A help screen 300, which is displayed when the help key 121 shown in FIG. 2 is operated, is a screen for displaying explanations about functions of the respective parts of the digital mixer 10, the operation procedure for putting the digital mixer 10 into a desired operation, and so on. The contents displayed on the help screen 300 are decided based on the help data read by the CPU 11 from the memory connected to the memory I/F 15.

In the help screen 300, provided are a section display portion 301, a preceding section button 302, a subsequent section button 303, an end button 304, an explanation display portion 310, a table of contents display portion 320, and knobs 311, 321.

Among them, the explanation display portion 310 is an area to display text of the explanations. In this portion, the contents of the explanations prepared in the help data are continuously displayed, and by scrolling the screen, it is possible to refer to the contents of the explanations at preceding and subsequent positions in sequence.

The knob 311 is a control for accepting an instruction to scroll the explanation display portion 310, and while the help screen 300 is displayed, the knob 311 is assigned to the rotary encoder 111 of the right-end channel strip 110 shown in FIG. 2, and by rotary-operating this rotary encoder 111, it is possible to give an instruction to scroll the display of the explanation display portion 310. Of course, to give the scroll instruction, a drag operation of touching the touch screen 16 and rotating the knob 311 or the use of a pointing device such as a mouse may be adopted.

When the scroll instruction is given by such an operation, the CPU 11 increments/decrements a display start line number of the explanations in the explanation display portion 310 (a value indicating a line number at which the display of the explanations should be started in the explanation display portion 310), thereby scrolling the explanations displayed in the explanation display portion 310.

The table of contents display portion 320 is an area displaying the table of contents of the explanations displayed in the explanation display portion 310, based on data relating to the chapter constitution of the explanations, which data is extracted from the help data. It is also possible to scroll the table of contents display portion 320, similarly to the explanation display portion 310, by operating the rotary encoder 111 of the left-end channel strip 110 shown in FIG. 2 to which the knob 321 is assigned.

In the table of contents display portion 320, by touching a heading position of each section, it is possible to display, in the explanation display portion 310, an explanation from the head position of this section. Further, in the table of contents display portion 320, a section where a cursor 322 resides is a section whose contents are currently displayed in the explanation display portion 310. It can be determined which section is a section currently displayed in the explanation display portion 310, based on, for example, the head position of the explanation display portion 310.

A section whose contents are currently displayed in the explanation display portion 310 is also indicated by a section name displayed in the section display portion 301.

The preceding section button 302 and the subsequent section button 303 are buttons for accepting an instruction to jump the display start position of the explanations in the explanation display portion 310 to the head of a section preceding to the currently displayed section and to the head of a section subsequent to the currently displayed section, respectively. When the preceding section button 302 or the subsequent section button 303 is touch-operated, the CPU 11 sets a start position of a jump destination section as the display start line number of the explanations and updates the display in the explanation display portion 310, and also accordingly changes the display in the table of contents portion 320 and the display in the section display portion 301.

The end button 304 is a button for accepting an instruction to close the help screen 300. When the end button 304 is touch-operated, the CPU 11 closes the help screen 300 to display an original screen.

Next, the help data used for displaying the help screen as shown in FIG. 6 will be described, by using a concrete example. FIG. 7 and FIG. 8 show the concrete example. The help data shown in FIG. 7 and FIG. 8 are a series of data (data recorded as one file) but are divided into two sheets because of limitations of space.

As shown in FIG. 7 and FIG. 8, the help data read by the digital mixer 10 is described in a format of XML (eXtensible Markup Language) which is a markup language.

In the help data, an "exphelp" tag 401 which is a help tag indicating that the described data is the help data is arranged as the highest-level tag, and as its attribute, data indicating a version of an XML schema conforming to a help screen display application to be used for processing of the help data is described in "version", and data indicating for which model the explanations in the help data are written is described in "modelname".

When the CPU 11 reads this help data, a format of the help data is checked by using an XML schema designated by firmware, and it is confirmed that the help data is usable in the processing by the help screen display application prepared in the digital mixer 10. At this time, it can be first determined, based on the presence/absence of the "exphelp" tag 401, whether or not the read data is the help data. Further, based on values of its attributes "version" and "modelname", it can be determined whether or not the data to be processed is data that can be appropriately processed by the help screen display application, and whether or not the data to be processed is data conforming to the model of the digital mixer 10.

What kind of tags can be used as subelements of the "exphelp" element to describe the contents of the help data depends on a function of the help screen display application used for the processing of the help data, and here, the following tags are usable.

First, "section" elements described by using "section" tags can be used as direct subelements of the "exphelp" element. The contents of one "section" element correspond to one section of the explanations displayed on the help screen. Further, as attributes of the "section" tag, "id" and "title" can be described. By "id", section identification data used for specifying a link destination or the like can be specified, and by "title", a character string used as a title when the section is displayed can be specified.

For example, in the shown example, as for a section indicated by the "section" tag 402, "NAME_AND_FUNCTION" is specified as the identification data, and "Names and functions of respective sections" is specified as a character string used as the title.

Incidentally, as a subelement of a "section" element, another "section" element can be described, and thereby a section can be nested. In the shown example, four "section" tags denoted by the reference numerals 402, 403, 404 and 406 are described in a four-stage nesting structure. A "section" tag 409 and the "section" tag 406 are described as parallel tags showing subelements of a "section" element indicated by the "section" tag 404.

Further, as a subelement of a "section" element, a "helpanchor" element can be also described. A "helpanchor" tag showing this element is an anchor tag used as a marker for determining a display start position being a jump destination when the display position of the explanations is to be jumped according to an operation of a control. Describing the "helpanchor" element as a subelement makes it possible to append a marker to the "section" element. Further, in the "helpanchor" tag, "id" can be described as an attribute, and this "id" indicates that this "helpanchor" tag is used as a marker when a control with this identification data is operated. Incidentally, as the identification data, identification data used in the model specified in the attribute "modelname" of the "exphelp" tag 401 should be used.

In the shown example, a "helpanchor" element indicated by a "helpanchor" tag 405 is described as a subelement of a "section" element indicated by the "section" tag 404. Further, "helpanchor" tags 410, 411 with the same "id" are described as subelements of different "section" elements. In this manner, the markers using the "helpanchor" tags with the same "id" can be appended to a plurality of "section" elements. Further, markers corresponding to a plurality of "id" can be appended to one section by describing a plurality of "helpanchor" elements as subelements of one "section" element.

How the "helpanchor" tags are used will be described in detail later.

As a subelement of a "section" element, a "text" element can be described besides a "helpanchor" element. As the contents of the "text" element, text of the explanations displayed in the explanation display portion 310 shown in FIG. 6 can be described. In the example shown in FIG. 7, a "text" element indicated by a "text" tag 407 is described as a subelement of a "section" element indicated by the "section" tag 406, and the contents of this "text" element are text of an explanation of a section indicated by the "section" tag 406.

Further, as a subelement of a "text" element, it is also possible to describe an element using a display tag which includes format data based on which the text displayed in the explanation display portion 310 is formatted. In the example shown in FIG. 7, an element indicated by a "br" tag 408 is such an element. This element indicates that a line break should be inserted at a position of the tag, but besides, an element specifying color of a character string, an element specifying a display position (indent or the like), an element indicating the insertion of an image, and the like can be used.

How the display is actually controlled based on these display tags depends on the function of the help screen display application. Therefore, in a case where different help screen display applications are used, there is a possibility that the displays become different even though they are based on the same data. Therefore, if it is not specified which help screen display application is used for the display, the display tags can be said to be data specifying the kind of the format rather than the concrete display contents.

Incidentally, when the contents of a "text" element are displayed in the explanation display portion 310, it is also conceivable to insert an indent before each section or delimit each section. In this case, since data of a "section" tag is used for display formatting, the "section" tag can also be said to be a display tag.

Further, as a subelement of a "text" element, a "helplink" element can be described by using a "helplink" tag which is a link tag indicating a reference of data. In the "helplink" tag, "sectionid" can be described as an attribute, and by the "sectionid", a reference destination can be specified as identification data of a section. When a character string marked with a helplink tag is selected in the explanation display portion 310, the control is executed so as to make it possible to refer to data of a section having the identification data specified by "sectionid".

For this purpose, for example, it is conceivable that a character string marked with a "helplink" tag is displayed in the explanation display portion 310 in a distinguishable manner from the other portion, and when the character string is touch-operated, the display in the explanation display portion 310 is jumped to a position of a section having the identification data specified by "sectionid". Besides, it is also conceivable that the contents of the section having the identification data specified by "sectionid" are displayed on a pop-up window. Further, as an attribute of a "helplink" tag, identification data of a screen may be made specifiable and the screen may be pop-up displayed on the touch screen 16 in response to a touch operation.

In the shown example, in FIG. 8, a "helplink" tag 412 having "MIX_MATRIX_ENCODER" as the attribute "sectionid" is described. This tag indicates that information of a section indicated by the "section" tag 406 in FIG. 7 should be made referable when a portion of "[MIX/MATRIX] encoders" which is a character string marked with a tag in the explanation display portion 310 is selected.

The foregoing is an overview of the help data.

Next, processes that the CPU 11 of the digital mixer 10 executes for displaying the help screen will be described.

In the digital mixer 10, the help data used for displaying the help screen is recorded in the memory which is to be mounted in the memory I/F 15, and is read from the memory when the memory is mounted in the memory I/F 15. Various other data are also recorded in the memory and can be read by the digital mixer 10.

Figure 9:
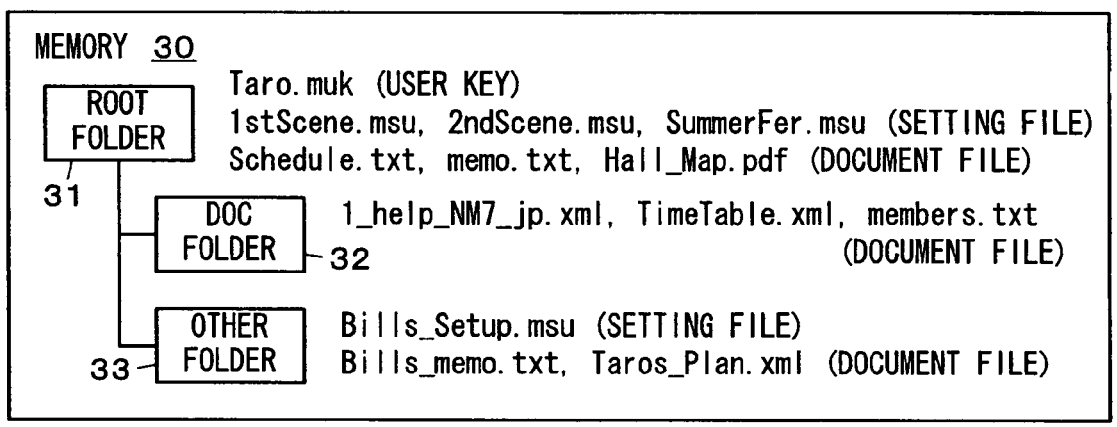
FIG. 9 is a view showing an example of data recorded in a memory which is to be mounted in a memory I/F of the digital mixer shown in FIG. 1.

Here, FIG. 9 shows an example of the data recorded in the memory which is to be mounted in the memory I/F 15.

As shown in FIG. 9, in a memory 30 which is to be mounted in the memory I/F 15, not only a root folder 31 which is the highest-level folder but also a DOC folder 32 and an OTHER folder 33 are prepared as lower-level folders, and data can be recorded as files in these folders.

Data recorded in the memory 30 are roughly classified into user keys, setting files and document files.

Among them, the user key is certification data for certifying a user who intends to use the digital mixer 10. The user key includes: a user name which is collated with user data registered in the flash memory 12 of the digital mixer 10 side; and data indicating a setting file to be read by the digital mixer 10 when the user is certified by the digital mixer 10. The user key is recorded in the root folder 31.

The setting file is a file including one set of values of parameters used for signal processing in the digital mixer 10 and data of a library of this set. When the digital mixer 10 reads the setting file, the values of the parameters included in the setting file are set, as values of the parameters actually used for the signal processing, in a current memory and in the library, within the scope of the authority of the certified user. The setting file may be stored in any folder, providing that a path is described in the user key.

The document file is a file including data such as text and images to be presented to a user. The help data in XML format shown in FIG. 7 and FIG. 8 is also one of the document files. Besides, it is also conceivable to record document files in text format or in PDF (Portable Document Format) in the memory 30. Incidentally, the document file used when the help screen is displayed is recorded in the DOC folder 32.

The CPU 11 of the digital mixer 10 executes processes for the user certification and for the preparation for displaying the help screen, by using the above-described data when the memory is mounted in the memory I/F 15.

Figure 10:
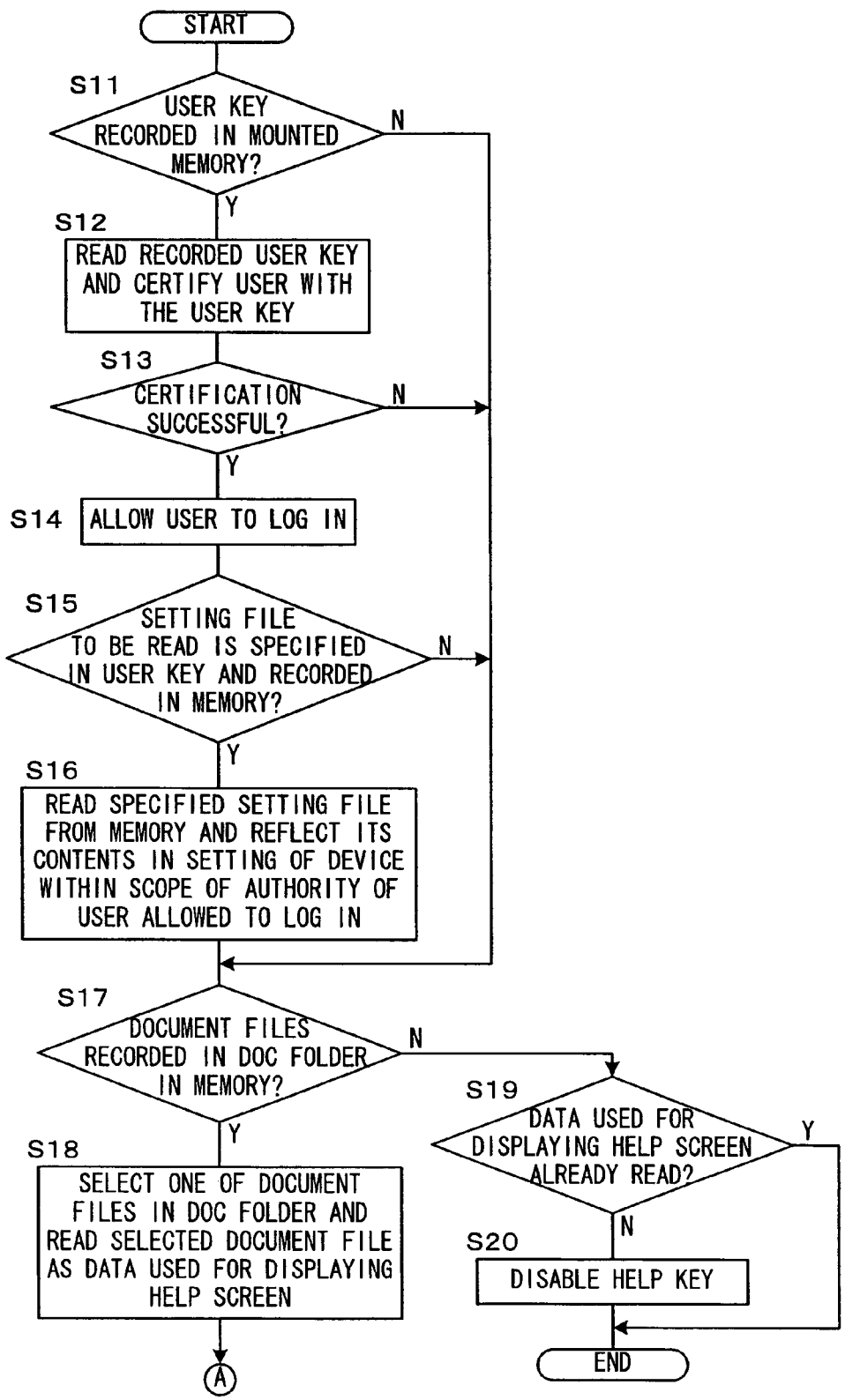
FIG. 10 is a flowchart showing processes executed by a CPU of the digital mixer shown in FIG. 1 when the CPU detects a mount event of the memory in the memory I/F.

Next, FIG. 10 shows a flowchart of processes which are executed by the CPU 11 when the CPU 11 detects a memory mount event in the memory I/F 15.

The CPU 11 executes the processes shown in the flowchart in FIG. 10 when detecting the memory mount event in the memory I/F 15.

Then, if the user key is recorded in the mounted memory, the CPU 11 reads the user key and certifies the user with the user key (S11, S12). Here, since it has been preconditioned that the user key is recorded in the root folder 31 of the memory, it is only necessary to search this folder. Further, if a plurality of user keys are recorded, a user key used for the certification is determined in a manner that, for example, the user selects one of the user keys for use, or a user key for use is automatically selected based on an appropriate condition, such as in alphabetical order of file names or in order of the recording date and time.

In the certification process, for example, the user is asked to input a password and the inputted password is collated with a password which is stored in advance in the digital mixer 10 as a password corresponding to the user name included in the user key.

Then, when the certification is in a success, the user who puts the memory in the memory I/F 15 is certified as having the authority to use the digital mixer 10, and the CPU 11 allows the user to log in (S13, S14).

Thereafter, if a setting file to be read in the user key is specified and the specified setting file is recorded in the memory, the CPU 11 reads out the specified setting file from the memory, and reflects the contents thereof in the setting of the digital mixer 10 within the scope of the authority of the user who is allowed to log in (S15, S16).

Here, data indicating the authority of the user is stored as one of the user data in the digital mixer 10 in advance in correspondence to the user name. As the contents of the authority, it is conceivable to stipulate whether or not the user has the authority to switch patches, recall and store a scene, recall and store a library, make the setting of a bus, make the setting of a channel group, load and save each data of the setting file, and the like.

Incidentally, the password used for the user certification and the data indicating the user's authority may be included in the user key to be used as a basis of the password collation and the authority determination. In such a case, the user key may include data such as a model name or an ID number specifying a device that the user is permitted to use, and based on the comparison of the model name, the ID number, or the like with that of the own device, only the certification of a user permitted to use the own device may be made successful.

After Step S16, the flow goes to Step S17. Processes at and after Step S17 are processes for the preparation for displaying the help screen.

Here, if document files are recorded in the DOC folder 32 in the memory, the CPU 11 selects one of them to be read as the help data used for displaying the help screen (S17, S18). Incidentally, which kind of format a file to be read should have is determined in advance. Here, files in XML format (with .xml extension) and in text format (with .txt extension) are files to be read, but files in HTML format or in PDF format may be defined as files to be read.

If there are a plurality of files that can be files to be read, one of them is automatically selected to be read, based on the criteria that the first one or the last one in order of the character code of the file name should be selected, one with the latest update time is selected, one in XML document format is given a priority, or the like. Alternatively, the user may be made to select a file to be read.

If the digital mixer 10 has data which has already been read as the help data, this data is replaced by newly read data at an instant when the data is newly read.

In the process at Step S18, the CPU 11 functions as a loader. After Step S18, the flow goes to Step S21 in FIG. 11.

If no document file is found at Step S17, and the data used for displaying the help screen has not been read (S19), the CPU 11 disables the help key 121 (S20) and the process is finished since the help screen cannot be displayed. If the help key 121 is operated in this state, a message to the effect that the help screen cannot be displayed because of the absence of the help data may be displayed on the touch screen 16.

Further, as will be described later, even if the memory is removed from the memory I/F 15, the data for displaying the help screen once read is retained in the digital mixer 10. In this case, even if the data cannot be newly read at Step S17, the help screen can be displayed by using the data already read. Therefore, if YES at Step S19, the process is immediately finished.

If NO at Step S11 or S13, the user is not allowed to log in, but is allowed to use the digital mixer 10 with the authority as a guest, that is, in a state where only operations permitted to anyone are permitted. In this case, since it is desirable that the help function is usable, the processes at and after Step S17 are executed in the same manner as in the case where the user is allowed to log in.

If NO at Step S15, the flow also goes directly to Step S17.

Figure 11:
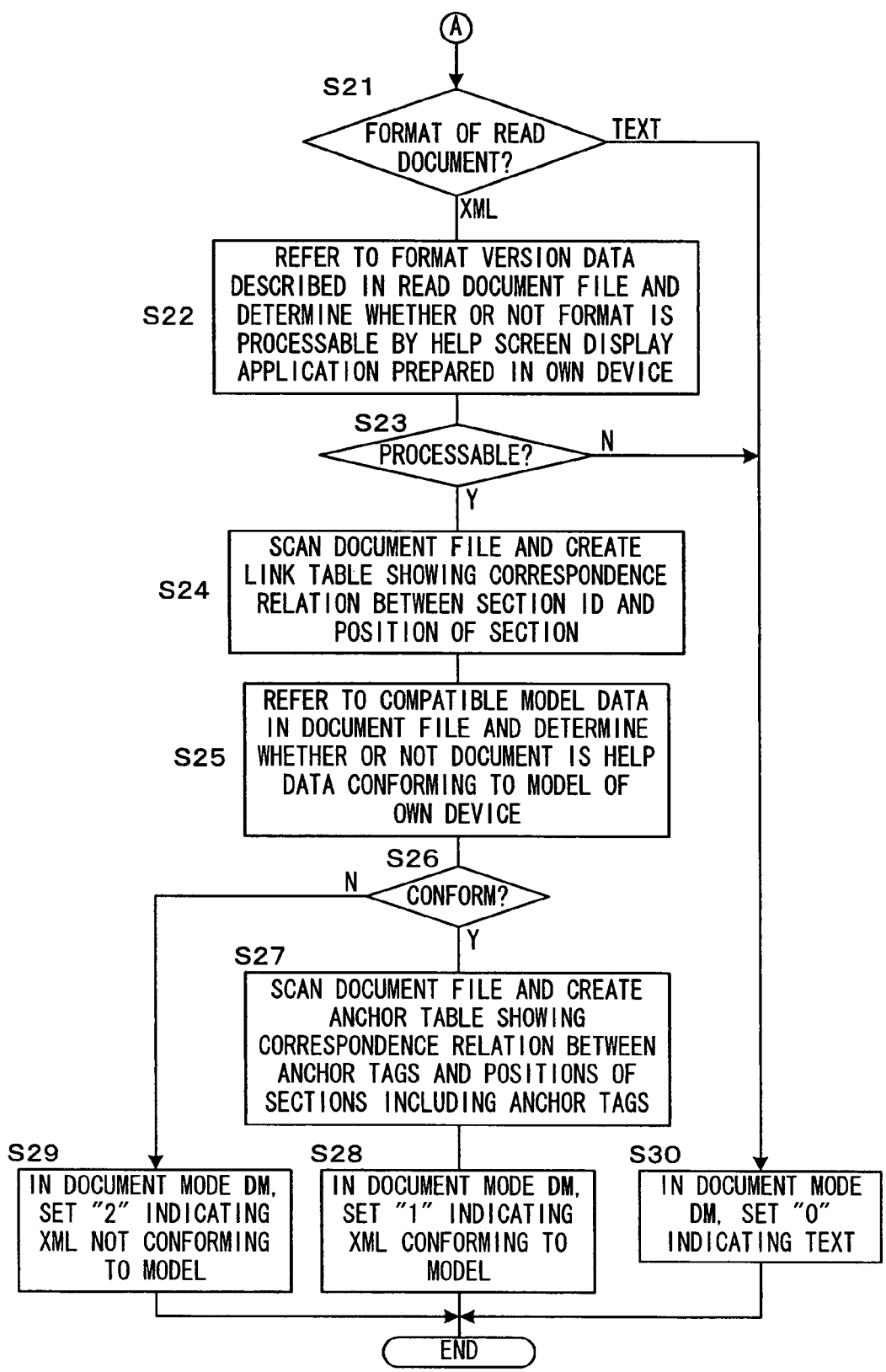
FIG. 11 is a flowchart showing processes continuing from FIG. 10.

Further, in processes shown in FIG. 11, if the document file read at Step S18 is in XML format, the CPU 11 refers to format version data (the contents of the attribute "version" of the "exphelp" tag in the example shown in FIG. 7) described in the read document file, and determines whether or not this format is processable by the help screen display application prepared in the digital mixer 10 (S21, S22). At this time, the YES determination may be made if the format of the read document file is determined as appropriate when the format is checked by the XML schema used by the help screen display application prepared in the digital mixer 10.

If the format is processable (S23), the flow goes to processes at and after Step S24, namely, interpretation processes of the XML document by the help screen display application.

Then, in this portion of processes, first, the CPU 11 scans the read document file, and create a link table showing the correspondence relation between section IDs and positions of the sections (S24).

FIG. 12 shows an example of the link table. However, concrete values of data shown in FIG. 12 do not correspond to the data shown in FIG. 7 and FIG. 8.

As shown in FIG. 12, the link table shows the correspondence relation between identification data of sections (section ID) and start positions of the sections (section positions), each of the start positions being a position at which an explanation of the section starts when displayed in the explanation display portion 310 of the help screen 300 based on the document file.

The section ID may be the data described as the attribute "id" of each of the section tags included in the document file, and the section position may be determined based on which line in the display of the explanation display portion 310 the start position of the section falls on. In a case where the help data in XML format is given, it can be expected, based on the arrangement of the tags in the help data, the interpreted contents of each of the tags, and so on, how the display is formatted when the help screen is displayed by the help screen display application based on the help data. Therefore, based on this expectation, it can be also found which line in the display the start position of each section falls on.

Incidentally, instead of finding which line in the actual display screen the start position falls on, the number of lines may be counted on assumption that a line feed is inserted every time a tag indicating a line feed on the display, such as a "section" tag or a "br" tag, is provided.

Further, at an instant when the link table is created, display data for displaying the help screen 300 also including portions other than the explanation display portion 310 may be generated by processing the read document file.

Referring to FIG. 11 again, after Step S24, the flow goes to Step S25, where the CPU 11 refers to compatible model data in the read document file (in the example shown in FIG. 7, the data described as the attribute "modelname" of the "exphelp" tag), and determines whether or not the document file is help data conforming to the model of the own device. In this determination, it is conceivable that a model code of the own device and compatible model codes are stored in the flash memory 12 or the like and the read document file is compared with these model codes.

Then, when the document file is determined as conforming to the own model (S26), the CPU 11 scans the document file, and create an anchor table showing the correspondence relation between anchor tags and positions of sections including the tags (S27), and sets "1" indicating that the help data is XML data conforming to the model in a (register indicating) document mode DM (S28), and then the process is finished.

Incidentally, the above compatible range can cover, for example, models in the same series with a different number of channels, upper models having all the functions of lower models and provided with other functions, and the like. This is because, in these models, IDs are sometimes assigned to functions and controls based on the same criteria even if they are different models, and in such a case, even when the help data written for an upper model is used in a lower model, it can be thought that there occurs no problem in using the anchor tags. On the other hand, if the help data written for the lower model is used in the upper model, there may be a case where the help data does not include anchor tags corresponding to some of controls provided in the upper model, but it can be thought that this does not cause any problem in using the anchor tags included in the help data.

Basically, it is preferable that the help data is prepared for each model and used in the specific model, but by determining that the help data conforms to the model of the own device even if it is within the compatible range, it is possible to improve versatility of the help data and reduce a burden of creating the help data.

FIG. 13 shows an example of the anchor table. However, concrete values of data shown in FIG. 13 do not correspond to the data shown in FIG. 7 and FIG. 8.

As shown in FIG. 13, the anchor table shows the correspondence relation between identification data of controls (control ID) set in respective anchors and start positions of sections (section positions) including the anchors, each of the start positions being a position at which an explanation of the section starts when displayed in the explanation display portion 310 of the help screen 300 based on the document file.

The control ID may be data described as the attribute "id" of the "helpanchor" tag included in the document file, and the section position may be decided based on which line in the display in the explanation display portion 310 the start position of the section including the "helpanchor" tag falls on. The correspondence relation between the section ID and the section position is found from the link table shown in FIG. 12, and therefore, the data described as the attribute "id" of the "section" tag which includes the "helpanchor" tag as a lower-order element is used as a key to search the link table, whereby data of the section position can be obtained.

Incidentally, as described in FIG. 7 and FIG. 8, since "helpanchor" tags with the same "id" can be described as subelements of a plurality of "section" tags in the help data, a plurality of section positions are sometimes registered for the same control ID also in the anchor table.

Further, in FIG. 13, the contents of the anchor table are sorted in ascending order of the control IDs. However, this is not essential and the sorting may be in order of the section positions.

Referring to FIG. 11 again, if it is determined at Step S26 that the read help data does not conform to the model of the own device, the CPU 11 sets "2" indicating that the help data is XML data not conforming to the model in the document mode DM at Step S29 and the process is finished without creating the anchor table.

If it is determined at Step S21 that the read document file is in text format or it is determined at Step S23 that the read document file is in XML format not processable, the CPU 11 sets "0" indicating that the help data is text data in the document mode DM at Step S30, and the process is finished without creating the link table and the anchor table.

Through the above processes, when the memory is mounted in the memory I/F 15, it is possible for the digital mixer 10 to certify the user by using the certification data recorded in the memory, read the help data from the same memory, and prepare for displaying the help screen by using the read data.

Incidentally, if the document file read as the help data is text data or XML data in a format not processable by the help screen display application (tags cannot be appropriately interpreted by the help screen display application), the display position jump function utilizing the links or the anchors is disabled, and the contents of the help data are simply displayed as text in the explanation display portion 310 of the help screen 300. If the XML data is displayed in this manner, the tags are also displayed as they are, resulting in a hard-to-see display, but since the contents are described in text, a user can understand the contents to some extent from the display.

If the document file read as the help data is XML data in a format processable by the help screen display application, it is possible to interpret the contents of tags for formatting the display and the contents of tags specifying links and to utilize the link function and the like using the tags, irrespective of the model of the digital mixer 10. This is because the contents indicated by these tags are data in the help data.

However, anchor tags are associated with identification data of controls given from a device using the help data, and therefore, even if the contents of the tags can be appropriately interpreted, the operation utilizing the anchor tags cannot be sometimes as intended by a creator of the help data unless the help data itself is written for the model of the digital mixer 10.

For example, suppose identification data "1" is assigned to a "pan knob" in some model and the creator of the help data appends an anchor tag having "1" as "id" to a section explaining the "pan knob". However, in another model where the identification data "1" is assigned to a "fader", the section marked with the anchor tag having "1" as "id" is interpreted as a section explaining the "fader".

Therefore, here, it is determined not only whether or not the help data is in a format processable by the help screen display application but also whether or not the help data conforms to the model of the digital mixer 10, whereby the operation for displaying the help screen is changed according to the conformity or not. Concretely, if the help data does not conform to the model of the digital mixer 10, the jump function utilizing the anchor tags is disabled.

Further, in the digital mixer 10, not only the XML data including the tags interpretable by the help screen display application but also data in other formats can be read as the help data as described above. The XML data is editable by a user, and therefore, data edited by the user is sometimes read as the help data. However, since the function is enabled or disabled according to the format and the model conformity of the read data, it is possible to maintain the function of the help screen as much as possible even in a case where not only the genuine help data supplied by a manufacturing corporation but also the help data edited by a user can be used.

Further, the digital mixer 10 makes a user who is currently logging in log out when detecting that the memory is removed from the memory I/F 15, though this process is not shown. However, even after this, the user is permitted to use the digital mixer 10 with the authority of a guest, and therefore, the help data once read is kept in a usable state so as to enable the user to use the help function.

Next, based on the foregoing, feature portions of the processes executed by the CPU 11 to realize the display function of the help screen will be described.

Figure 14:
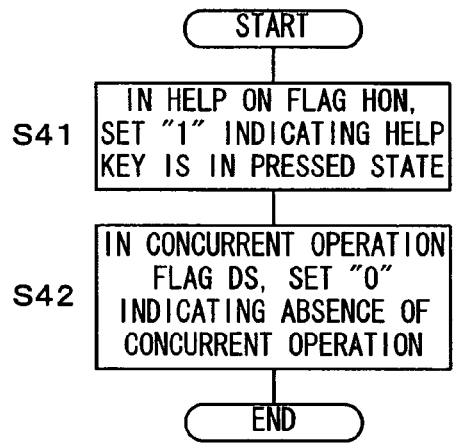
FIG. 14 is a flowchart showing processes executed by the CPU of the digital mixer shown in FIG. 1 when the CPU detects an ON event of a help key.

First, FIG. 14 shows a flowchart of processes when an ON event of the help key 121 is detected.

When detecting the ON event of the help key 121 shown in FIG. 2, the CPU 11 starts the processes shown in the flowchart in FIG. 14. Then, the CPU 11 sets "1" indicating that the help key 121 is in a pressed state in a help ON flag HON (S41) and also sets "0" indicating the absence of a concurrent operation in a concurrent operation flag DS (S42), and then the process is finished.

As described above, at an instant when the help key 121 is pressed, the digital mixer 10 only sets the values in the flags.

Figure 15:
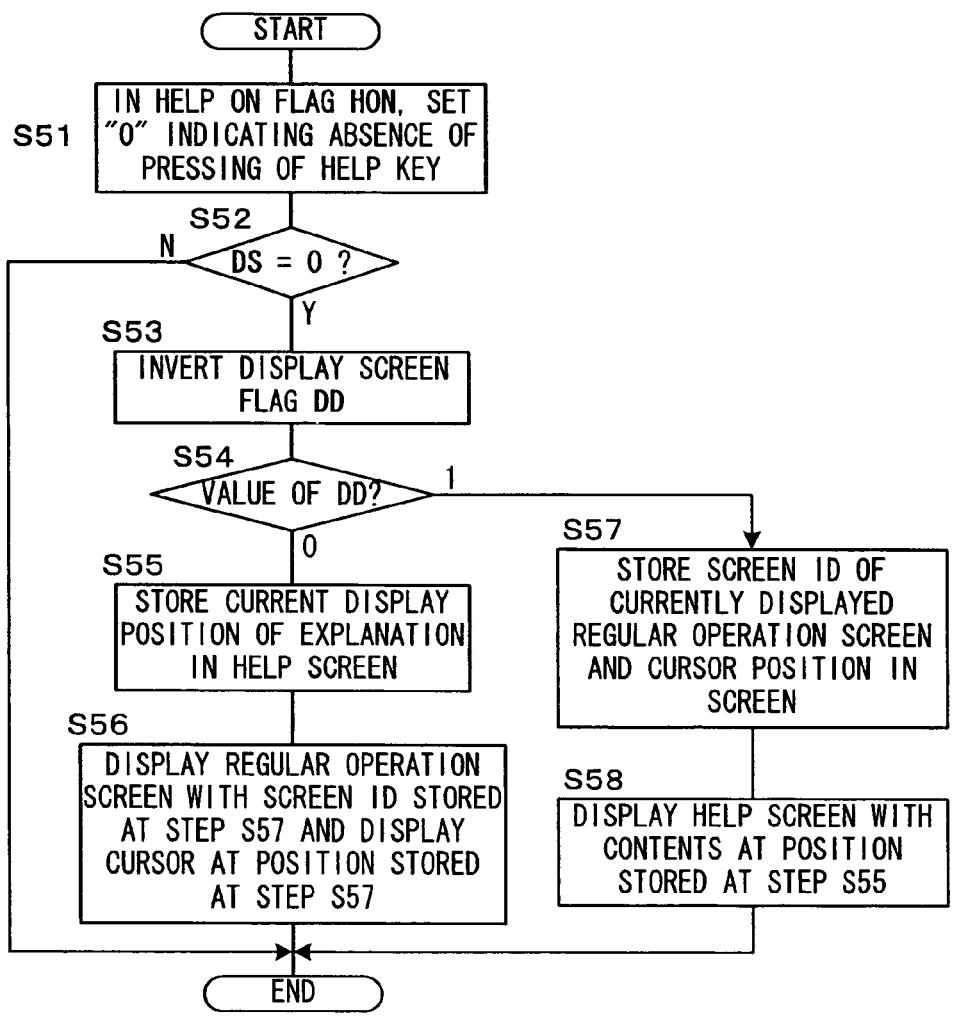
FIG. 15 is a flowchart showing processes executed by the CPU when the CPU detects an OFF event of the help key.

Next, FIG. 15 shows a flowchart of processes when an OFF event of the help key 121 is detected.

When detecting the OFF event of the help key 121 shown in FIG. 2, the CPU 11 starts the processes shown in the flowchart in FIG. 15.

Then, the CPU 11 firstly sets "0" indicating that the help key 121 is in a non-pressed state in the help ON flag HON (S51). Thereafter, if the value of the concurrent operation flag DS remains "0", it is determined that no other control is operated while the help key 121 is ON (S52), and therefore, the CPU 11 inverts a value of a display screen flag DD (S53). This flag is a flag in which "1" is set if a screen currently displayed on the touch screen 16 is the help screen 300, and "0" is set if a screen currently displayed on the touch screen 16 is not the help screen 300 but is a regular operation screen (for example, a screen for displaying or accepting the setting of values of parameters, as shown in FIG. 3 to FIG. 5).

Then, after Step S53, the CPU 11 finds the value of the display screen flag DD at Step S54. If the value is 0, the flow goes to processes at and after Step S55 in order to shift to the display of the regular operation screen. Then, the CPU 11 stores a current display position of the explanation, which is a display state in the help screen, as, for example, data of a line number (S55). Further, the CPU 11 displays, on the touch screen 16, a regular operation screen with a screen ID which is stored in a process at Step S57 when the screen switching took place last time, and a cursor at a cursor position similarly stored in the process at Step S57 (S56), and the process is finished.

Through these processes, the regular operation screen displayed prior to the switching can be displayed on the touch screen 16, in the same state as was displayed before the display was switched to the help screen 300 last time.

However, since values of parameters should be displayed according to the contents set at the time when the regular operation screen is displayed, not data stored previously but the values according to the contents set at the time of the display may be displayed as the values of the parameters. Further, if, besides the screen ID and the cursor position, there is display state data necessary for executing such display, this data is stored at Step S57 to be used for the process at Step S56.

On the other hand, if the value of the DD is 1 at Step S54, the flow goes to processes at and after Step S57 in order to shift to the display of the help screen. Then, the CPU 11 stores the screen ID and the position of the cursor in this screen as data indicating a display state of the currently displayed regular operation screen for later use in the process at Step S56 (S57). Further, the CPU 11 displays the help screen 300 on the touch screen 16, and the contents at the position which was stored in the process at Step S55 when the screen was switched last time are displayed as the contents of the explanation display portion 310 (S58). Thereafter, the process is finished. At Step S58, concretely, the explanations are displayed in the explanation display portion 310, starting at the line stored at Step S55.

The display in the table of contents display portion 320 and the section display portion 301 can be decided according to the position of the explanation displayed in the explanation display portion 310. Further, if the table of contents display portion 320 is scrolled independently of the explanation display portion 310, a current display position of the table of contents in the table of contents display portion 320 is also stored at Step S55 as the data indicating the display state of the help screen 300, and by utilizing this data, it can be decided, by the process at Step S58, which position of the table of contents is to be displayed in the table of contents display portion 320.

Through these processes, the help screen 300 can be displayed on the touch screen 16 in the same state as was displayed before the display was switched to the regular operation screen last time.

Figure 16:
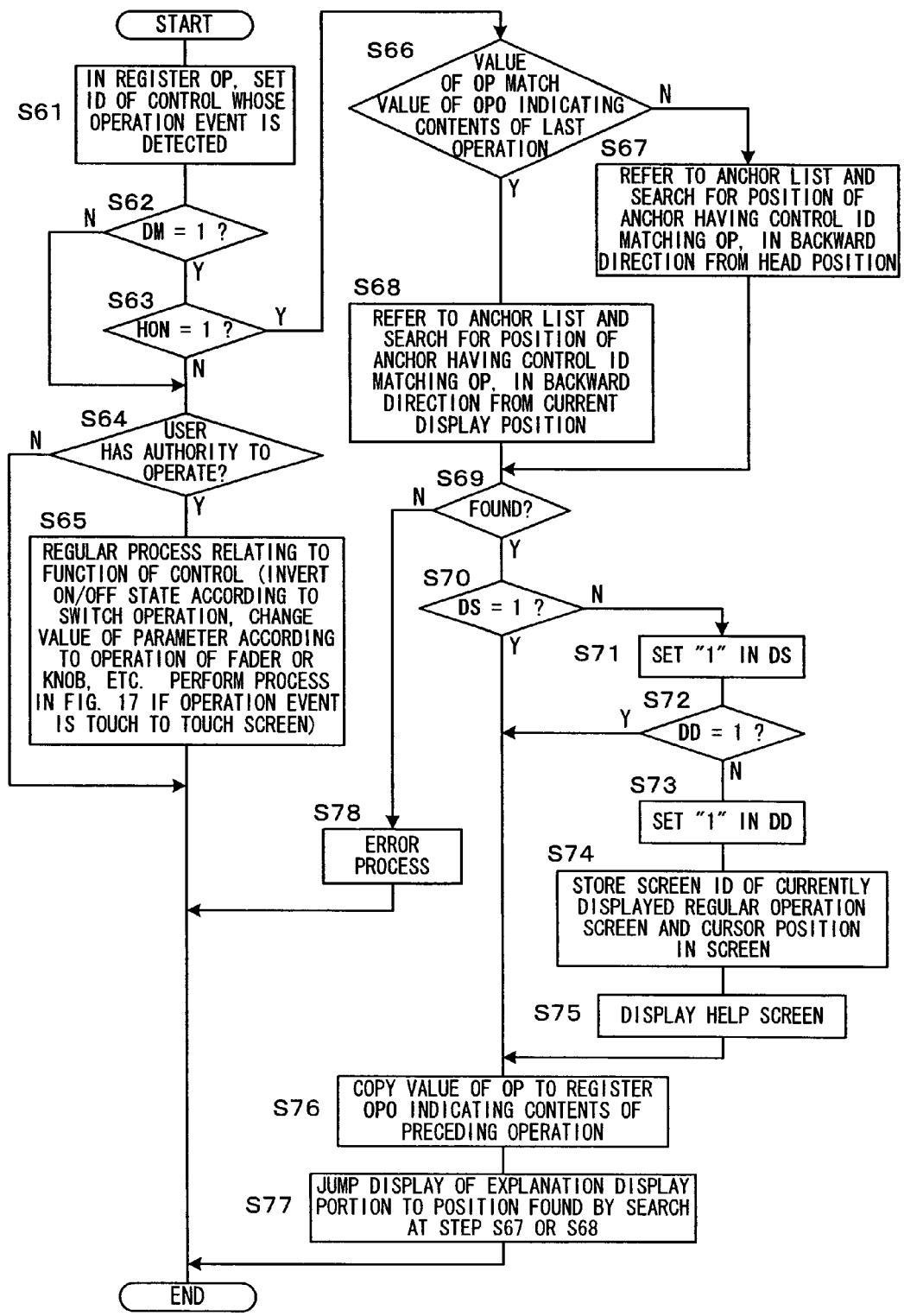
FIG. 16 is a flowchart showing processes executed by the CPU when the CPU detects an operation event of a control except of the help key.

Incidentally, if the value of the DS is not "0" at Step S52, the display contents should have been changed as required by the following processes shown in FIG. 16, and therefore, the display contents are not particularly changed in response to the help key OFF event.

In the above processes, the RAM 13 storing the data indicating the display position and the like functions as a screen content memory. Further, at Steps S56 and S58, the CPU 11 functions as a switch controller.

Through the above processes, when the OFF operation of the help key 121 takes place while no other control is operated during the ON operation of the help key 121, a screen to be displayed on the touch screen 16 can be switched by a toggle between two kinds of screens, namely, the help screen 300 and any of the regular operation screens other than the help screen 300, and at the time of the screen switching, the screen displayed after the switching can be in the same state as that of the same kind of screen most recently displayed.

Consequently, even if the help screen 300 is once erased by pressing the help key 121 and the regular operation screen is displayed again, only by operating the same help key 121 again, the help screen 300 can be displayed on the touch screen 16 in the state in which the explanation read prior to the erase is readable again. Therefore, even in a case where a user performs an operation on the regular operation screen while reading the explanation by sequentially scrolling the display in the explanation display portion 310 on the help screen 300, high operability can be obtained.

Next, FIG. 16 shows a flowchart of processes executed when an operation event except the operation event of the help key 121 is detected. The operation mentioned here includes a touch to the touch screen 16.

When detecting an operation event except the operation event of the help key 121, the CPU 11 starts the processes shown in the flowchart in FIG. 16.

First, the CPU 11 sets an ID which is identification data of a control whose operation event is detected, in a register OP whose value indicates data of a currently operated control (S61). Incidentally, this ID does not have to be assigned to each control in one-to-one correspondence. For example, the same ID may be assigned to all the controls of some section such as a selected channel section. Further, IDs set in the register OP and used for the jump function utilizing anchor tags in processes at and after Step S66 may be prepared separately from IDs for identifying individual controls.

Further, if the operation event is a touch to the touch screen 16, the CPU 11 determines whether or not the touch operation corresponds to an operation of a control on the screen, according to the contents of the currently displayed screen and the touch position, and if the touch operation corresponds to the operation of the control, the CPU 11 sets an ID of the control in the register OP. If the touch operation does not correspond to the operation of a control, dummy identification data simply indicating that the touch operation of the touch screen 16 took place is set.

Then, unless DM=1 or HON=1 (S62, S63), that is, if the help data used for displaying the help screen 300 is not XML data conforming to the model of the digital mixer 10 or if the operation of the control is not performed during the operation of the help key 121 even though the help data is XML data conforming to the model of the digital mixer 10, the flow goes to processes at and after Step S64.

Then, in this case, if the user has the authority to perform an operation corresponding to the detected operation event, the CPU 11 executes a regular process relating to the function of the control according to the contents of the operation event, and the process is finished (S64, S65). Examples of such a process are to invert an ON/OFF state of a parameter according to the operation of a switch, change a value of a parameter according to the operation of a fader or a knob, and the like.

Incidentally, the process executed at Step S65 also includes the process executed when the rotary encoder 111 to which the knob 311 or the knob 321 is assigned is operated while the help screen 300 is displayed, that is, the process for scrolling the display in the explanation display portion 310 or the table of contents display portion 320 according to this operation. In this case, the CPU 11 functions as a scroll controller.

Figure 17:
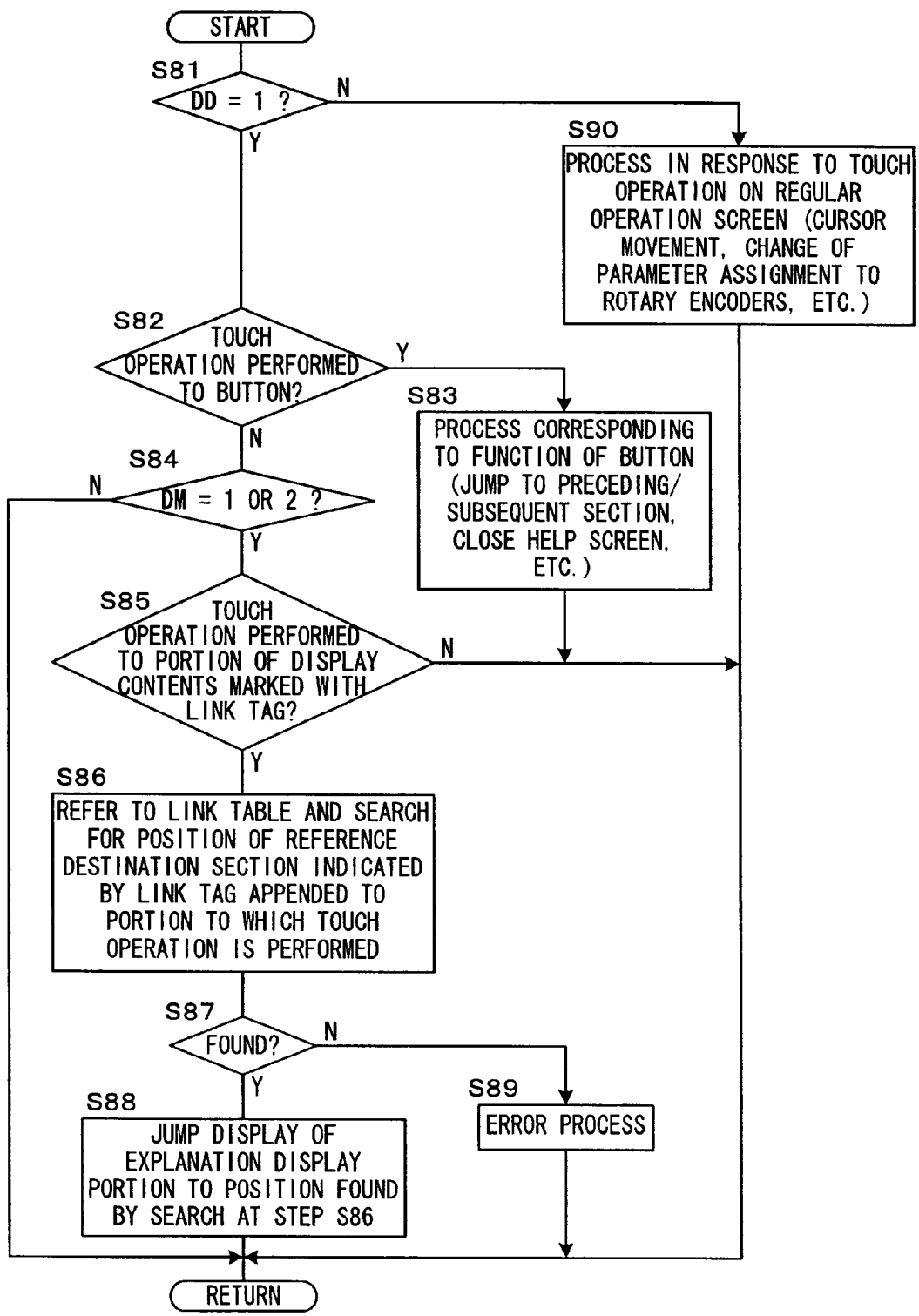
FIG. 17 is a flowchart showing processes executed at Step S65 in FIG. 16 when the detected operation event is a touch to the touch screen.

Further, if the detected operation event is a touch to the touch screen 16, the CPU 11 executes processes shown in FIG. 17 at Step S65.

Further, if it is determined at Step S64 that the user does not have the authority, the process is immediately finished, and a warning to the effect that the user has no authority may be displayed.

On the other hand, if YES at both S62 and S63, that is, if the help data used for displaying the help screen 300 is XML data conforming to the model of the digital mixer 10 and the control is operated while the help key 121 is ON, the CPU 11 executes processes at and after Step S66, that is, processes relating to the function to jump the display in the explanation display portion 310 to the position where the contents corresponding to the operated control exist are executed by utilizing the anchor tag. In this portion of the processes, the operation of another control while the help key 121 is operated is handled as a jump instruction to display an explanation corresponding to the operated control on the help screen 300.

Then, if the value of the register OP does not match a value of a register OPO indicating the contents of the last operation, that is, if the operated control has different identification data from that of a control operated last time (NO at S66), the CPU 11 refers to the anchor list, and searches the position of an anchor whose value of the control ID matches the value of the OP for in a backward direction, starting at the head position of the explanation in the explanation display portion 310 of the help screen 300 (S67). By this search, the head position of an explanation corresponding to the operated control is searched for.

Then, if the anchor position can be found by this search (S69), the flow goes to processes at and after Step S70, that is, processes for updating the display of the help screen 300.

In this portion of the processes, first, if the value of the concurrent operation flag DS is not "1", the CPU 11 sets "1" indicating that the help key 121 and another control are concurrently operated, in the DS (S70, S71). Then, if the value of the display screen flag DD is not "1", the CPU 11 sets "1" in the DD and displays the help screen 300 on the touch screen 16 (S72 to S75), similarly to the case of Steps S53, S57, and S58 in FIG. 15. However, there is no need here to reproduce the contents which were displayed before the last screen switching.

Then, the CPU 11 copies the value of the register OP indicating the contents of the current operation to the resister OPO indicating the contents of the preceding operation (S76), and makes the display in the explanation display portion 310 on the help screen 300 to jump to the position found by the search executed at Step S67 (or S68) (S77), that is, the contents for one screen from the line number obtained by the search executed at Step S67 are displayed in the explanation display portion 310, and the process is finished. At this time, the display contents in the table of contents display portion 320 and the section display portion 301 may be accordingly updated.

Incidentally, if DS=1 at Step S70 or if DD=1 at Step S72, the help screen 300 should have already been displayed, the flow goes directly to Step S76 and the CPU 11 executes only the copy of the resister value and the change of the display contents.

Further, if NO at Step S69, that is, if an appropriate anchor cannot be found by the search executed at Step S67 (or S68), the CPU 11 executes an error process, for example, displaying a message which represents that no explanation corresponding to the operated control is found in the help data currently in use on the touch screen 16 (S78), and the process is finished.

Further, if it is determined at Step S66 that the value of the register OP matches the value of the resister OPO indicating the contents of the preceding operation, this means that the control having the same identification data is repeatedly operated. In this case, the flow goes from Step S66 to Step S68, where the CPU 11 executes the search for the anchor position similar to that at Step S67, but this search is started at the current display position of the explanation in the explanation display portion 310. Therefore, by this search, it is found where, in the explanation corresponding to the operated control, a portion next to the current display position is positioned relative to the head position. Further, if this cannot be found even if the search is executed up to the end, the search is continued from the head up to a position immediately before the current display position.

Processes thereafter are the same as those in the case of NO at Step S66.

In the above processes, if NO at Step S66, the CPU 11 functions as a first help controller in the processes at Step S67 and S69 to S77, and if YES at Step S66, the CPU 11 functions as a second help controller in the processes at Steps S68 to S77.

Through the above processes, if the jump instruction is repeatedly given for the control having the same identification data, the contents at a position next to the position of the contents displayed according to the last jump instruction, out of the contents corresponding to the identification data of the control, can be displayed on the help screen 300. On the other hand, if the control for which the jump instruction is given has different identification data from that of a control for which the jump instruction is given last time, the contents at the head position, out of the contents corresponding to the identification data of the control operated this time, can be displayed on the help screen 300.

Therefore, even in a case where explanations corresponding to some control exist at a plurality of dispersed positions in the explanations to be displayed on the help screen, by repeatedly operating the control multiple times while pressing the help key 121, it is possible to easily browse the explanations existing at the dispersed positions from the head, so that the explanations can be efficiently referred to.

Further, in a case where the display jump is executed in response to the concurrent operation of the help key 121 and another control as described above, the help key 121 is preferably a hardware key. This is because, if the help key 121 is a software key, the concurrent operation with another key in the same screen cannot be detected on an ordinary touch screen.

Next, FIG. 17 shows a flowchart of processes executed at Step S65 in FIG. 16 when a touch event of the touch screen 16 takes place.

In these processes, if the value of the display screen flag DD is not "1", that is, if the help screen 300 is not currently displayed, the CPU 11 executes processes in response to the touch operation on the regular operation screen, that is, processes such as cursor movement, change of the parameter assignment to the rotary encoders 111, popup display of another screen such as the dynamics screen 250, and the like, and the flow returns to the original processes (S81, S90).

On the other hand, if DD=1, that is, the help screen 300 is currently displayed, and if the touch operation is performed to a button such as the preceding section button 302, the subsequent section button 303, or the end button 304 in the help screen 300, the CPU 11 executes processes according to the function of the button, and the flow returns to the original processes (S82, S83).

On the other hand, if the position of the touch operation is not on a button, and if the value of the document mode DM is "1" or "2", that is, if data used for displaying the help screen 300 is XML data whose tags are interpretable (S84), the flow goes to processes at and after Step S85 in order to execute processes relating to a link.

Then, if the position of the touch operation is at a portion of the display contents marked with a link tag (S85), the CPU 11 searches the link table shown in FIG. 12 for the position of a reference destination section indicated by the link tag appended to the portion to which the touch operation is performed (S86). Incidentally, since different identification data are assigned to respective sections, the same result should be obtained regardless of the start position of the search.

Then, if the position of the reference section is found as a result of the search, the CPU 11 makes the display in the explanation display portion 310 on the help screen 300 to jump to the position found by the search executed at Step S86 (S87, S88), and the flow returns to the original processes. At this time, the display contents in the table of contents portion 320 and the section display portion 301 may be accordingly updated.

Incidentally, if the position of the reference destination section is not found as a result of the search, the CPU 11 executes an error process of, for example, displaying a message which represents that the link is not found (S89).

If NO at Step S85, no further process is needed, and therefore, the flow returns directly to the original processes.

If NO at Step S84, that is, if the data used for displaying the help screen 300 is data without any tags or data whose tags cannot be interpreted, the link function cannot be used, and therefore, the flow returns to the original processes without executing the processes at and after Step S85.

According to the above processes, if a portion marked with a link tag in the help data is selected on the touch screen 16, data of the reference indicated by the link tag can be displayed on the help screen 300.

Incidentally, in the above processes, the title of each section displayed in the table of contents display portion 320 may be handled as being a link to the section (being a portion marked with the link tag indicating that the reference destination is this section).

In the foregoing, this embodiment has been described, but it goes without saying that the structure of the device, the format and contents of the data and the display screens, the concrete steps of the processes, and so on are not limited to those described in the above embodiment.

For example, by making data in HTML format or PDF format also readable as the help data and enabling the document mode DM to have values corresponding to these formats, it may be made possible to execute the control conforming to these file formats according to these values.

Further, the functions of the preceding section button 302 and the subsequent section button 303 of the help screen 300 need not be a function of shifting to a preceding section or a subsequent section, but in a case where the display is jumped by using an anchor tag or a link tag, these functions may be functions of returning to the position before the jump, and thereafter returning the display to the position after the jump again. Of course, the functions to be assigned to the preceding section button 302 and the subsequent section button 303 may be made selectable by a user.

Further, the attribute that each anchor tag has does not necessarily have to be the identification data decided according only to the kind of the control. For example, in a case of a key, such as a user-defined key, to which a user can freely assign a function for use, the function of the key changes according to the assignment, and therefore, the contents to be displayed as an explanation of the function of the key can also change.

To cope with such a case, by preparing anchor tags having identification data corresponding to the functions of the digital mixer 10, the contents corresponding to the identification data of the function assigned to an operated control may be made displayable on the help screen 300, in response to a concurrent operation of the control and the help key 121.

Considering that the identification data of the control automatically changes according to the function assigned to the control, this function can be realized also in the above embodiment.

Further, besides the identification data, for example, IDs of regular operation screens displayed on the touch screen 16 or channel numbers may be made specifiable as the attributes of the anchor tags, and thus, it may be made possible to change the contents of the jump action utilizing the anchor tags, depending on the ID of a regular operation screen being displayed at an instant when a control is operated, a channel assigned to the control, or the like.

For example, no jump action is executed while a screen having a certain ID is displayed, or on the contrary, the jump action is executed only while a screen having a certain ID is displayed.

Further, in the above-described embodiment, only one file is read as the help data, but a file used as the help data may be made selectable from a plurality of files which are read in advance. Further, a reference to other file may be made designatable in the help data. For example, if a relative path to the reference file is described as the attribute of a "section" tag, it is conceivable to make it possible to replace a "section" element corresponding to this section tag by a "section" element immediately under an "exphelp" element in the reference XML file.

Further, as a subelement of a "section" element, a keyword tag specifying a search keyword may be described to enable the specification of the search keyword such as "<keyword>keyword</keyword>", and a section may be made searchable by this keyword.

In this case, when a search instruction is given with the specification of a keyword, the contents of a section having this keyword are displayed in the explanation display portion 310 of the help screen 300. Further, specifying the same keyword for a plurality of sections may be permitted, thereby executing the same process as in the case where the anchor tags with the same ID are described in the plural sections.

Further, the data used for displaying the help screen may be made readable at the time other than when the memory is mounted in the memory I/F 15. For example, when an instruction is given from a user, a file designated by the user may be made readable as the help data. Consequently, the user can give an instruction to read another file, in order to change the contents of the help screen, if the user does not like the help screen displayed based on the help data which is read by automatic reading at the time when the memory is mounted.

Further, a plurality of help keys may be provided, and when the display of a screen is switched according to the OFF event of the help key or the concurrent operation of the help key and another key in the processes shown in FIG. 15 and FIG. 16, the current display position of an explanation in the help screen most recently displayed may be stored in correspondence to the help key which is operated when the help screen is displayed. Then, when the help screen is displayed next in response to the operation of this key, the contents at the position stored in correspondence to this key are displayed. Consequently, by alternately operating the plural help keys, it is possible to easily compare the contents at desired positions in the help data, which can further improve operability in referring to the help screen.

Further, in the invention, the display displaying the help screen need not be the touch screen, and may be a simple display.

Further, the contents displayed on the help screen need not be the explanations about the functions of the device and the controls, and may be memorandums prepared or added by a user as he/she likes.

Further, it goes without saying that the invention is applicable not only to an audio signal processing device such as a digital mixer but also to any electronic device having the function of displaying the help screen. In this case, the display need not be included in the electronic device.

Further, it goes without saying that the above-described embodiment or the modifications described in the modified examples may be appropriately combined within a consistent range.

As is apparent from the above description, according to the electronic device of the invention, even in a case where the contents corresponding to a control or its function exist at a plurality of dispersed positions in data used for displaying a help screen, it is possible to efficiently refer to these contents. Moreover, even in a case where the help screen cannot be displayed within one screen, high operability can be obtained when a user performs an operation on a regular operation screen other than the help screen while continuously reading the contents of the help screen.

Therefore, by applying the invention, it is possible to provide an electronic device with high operability.

What is claimed is:

1. An electronic device comprising:
    a display on which an operation screen among a plurality of operation screens is displayed in response to an operation by a user;
    a plurality of controls, each having an identification and a function executed when the control is operated by the user;
    an operation detector which detects a regular operation and a help operation on each of the controls by the user, the electronic device executing the function of a control when the regular operation on the control is detected by the operation detector;
    a help display controller which, in response to the help operation on a control detected by the operation detector, displays, on the display, a help screen, to display help contents explaining the function of each control based on help data, the help data including a plurality of positions of the help contents, and more than one positions of the help contents being associated with the identification of a control, the displayed help contents in a position associated with the identification of the operated control is displayed help contents providing an explanation about the operated control;
    a first controller which, when, after one help operation on a control of an identification is detected by the operation detector, another help operation on a control of an identification other than the identification is consecutively detected by the operation detector, controls the help display controller to display, on the help screen, help contents in a head position, out of the positions associated with the other identification; and
    a second controller which, when, after one help operation on a control of an identification is detected by the operation detector, another help operation on the same control of the same identification is consecutively detected by the operation detector, controls the help display controller to display, on the help screen, the help contents in a position associated with the identification, subsequent to a position where the help contents have been displayed in response to the one help operation.

2. An electronic device, as a model among a plurality of models, comprising:
    a plurality of controls, each having an identification and a function executed when the control is operated by a user;
    an operation detector which detects a regular operation and a help operation on each of the controls by the user, the electronic device executing the function of a control when the regular operation on the control is detected by the operation detector;

a loader which loads one of documents, including help data, in various formats, each help data including first information indicating a format of the document, second information indicating a model among a plurality of models, help contents explaining the function of each control of an electronic device of the model indicated by the second information, position data indicating positions of the contents and format data indicating a display styles for the help contents, one or more positions among the positions being associated with the identification of each control;

a display controller which displays, on a display, the help contents in one position among the positions of the document loaded by said loader, the position of the help contents displayed on the display is scrollable in response to a scroll operation by the user;

a first controller which controls said display controller to display the help contents in the loaded document in the display styles indicated by the format data on the display, only when determining that the loaded document is help data and the format indicated by the first information in the loaded document is interpretable by the display controller, and otherwise, controls said display controller to display contents of the loaded document as text on the display; and a second controller, operable only when determining that the loaded document is help data, the format indicated by the first information in the loaded document is interpretable by the display controller and the model indicated by the second information in the loaded document conforms to the model of the electronic device, which, in response to the help operation on a control detected by the operation detector, controls said display controller to display help contents in a position associated with the identification of the operated control, the displayed help contents in the position associated with the identification of the operated control is displayed help contents providing an explanation about the operated control.

3. An electronic device according to claim 2, wherein each of the position data is described as an anchor tag including the identification of a control and buried in a position of help contents where explanation of the control is described, and wherein in response to the help operation on the control detected by the operation detector, the second controller controls the display controller to display the help contents in the position of the anchor tag including the identification of the operated control, out of the help contents included in the help data.

4. An electronic device according to claim 2, wherein the format data included in the help data are one or more display tags, with which one or more portions of the help contents are marked, each indicating a display style for the marked portion of the help contents wherein said first controller controls said display controller to display the portion of the help contents, marked with each display tag, in the display styles indicated by the display tag on the display when determining that the one or more display tags included in the help data are interpretable.

5. An electronic device according to claim 2, further comprising:

an interface in which a removable memory, storing certification data and the help data, is mountable, the certification data being loaded by said loader together with the help data when the memory is mounted in said interface; and an access manager which certificates the user using the loaded certification data and grants authority of the certificated user to the user if the certification is successful, otherwise grants authority of a guest to the user wherein, when the regular operation on the control is detected by the operation detector, the electronic device executes the function of the control if the function of the control is within the scope of the authority granted to the user, and wherein said display controller displays the document loaded by said loader irrespective of the authority granted to the user.

6. An electronic device according to claim 1, further comprising a help key, wherein the operation detector detects, as the help operation on a control, any operation on the control by the user while the user keeps the help key in an ON state.

7. An electronic device according to claim 6, further comprising a switcher which, when the help key is released into an OFF state after any control is operated while the user keeps the help key in the ON state, controls the help display controller to stop displaying, on the display, the help screen such that the operation screen is displayed instead if the help screen have been displayed at the moment and to display the help screen if the operation screen have been displayed at the moment.

8. An electronic device according to claim 7, further comprising:

a scroll controller which scrolls a position of the help contents currently displayed on the help screen according to a scroll instruction by the user; and a screen state memory which stores an identification of the operation screen, most recently displayed on the display, and the position of the help contents on the help screen, most recently displayed on the display, wherein said switcher controls the help display controller to stop displaying, on the display, the help screen such that the operation screen, specified by the identification of the operation screen stored in the screen state memory, is displayed instead if the help screen have been displayed at the moment and to display, on the display, the help screen at the position stored in the screen state memory, if the operation screen have been displayed at the moment.

9. An electronic device according to claim 6, wherein the help key is a hardware key.

10. An electronic device according to claim 1, wherein the help contents, displayed on the help screen, include at least one portion in a position linked to an other position of help contents, wherein the electronic device further comprising a jump controller which, when the one portion of the help contents in the help screen is selected by the user, controls the display controller to display, on the display, the help contents in the other position linked to the one portion.

11. An electronic device according to claim 10, wherein the help contents in each position of the help data has a title, and wherein the titles of help contents in the help data are displayed on an area in the help screen, each title of the help contents displayed on the help screen is linked to a position of the help contents corresponding to the title and when the title on the area is selected by the user, the jump controller controls the display controller to display, on the display, the help contents in the position linked to the title.

12. An electronic device according to claim 2, wherein the help data further includes one or more link tags, each indicating a position in the help data as a reference destination, with which one or more portions of the help contents are marked, and the electronic device further comprising a jump controller which controls said display controller to display, on the display, the help contents in the reference destination indicated by the link tag, when a portion marked with the link tag in the help data is selected on a screen displayed on the display by the user.

13. An electronic device according to claim 2, further comprising:

an interface in which a removable memory, storing the document, is mountable, and wherein the document stored in the memory is loaded by said loader when the memory is mounted in said interface.

\* \* \* \* \*